(12) United States Patent
Shinkai

(10) Patent No.: US 8,004,583 B2
(45) Date of Patent: Aug. 23, 2011

(54) IMAGE PICKUP APPARATUS FOR USE WITH A CONSTRUCTION TABLE

(75) Inventor: Mitsutoshi Shinkai, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/710,702

(22) Filed: Feb. 23, 2010

(65) Prior Publication Data

US 2010/0188515 A1    Jul. 29, 2010

Related U.S. Application Data

(63) Continuation of application No. 11/789,236, filed on Apr. 24, 2007.

(30) Foreign Application Priority Data

Apr. 27, 2006    (JP) ................................ P2006-123530

(51) Int. Cl.
   *H04N 5/76*    (2006.01)
(52) U.S. Cl. .................................................. 348/231.2
(58) Field of Classification Search ............... 348/207.1, 348/211.5, 211.9, 229.1, 333.01, 211.8, 211.14, 348/231.99, 231.2, 231.3
   See application file for complete search history.

(56) References Cited

U.S. PATENT DOCUMENTS

| | | | |
|---|---|---|---|
| 7,349,011 B2 | 3/2008 | Hirasawa | |
| 2005/0212955 A1* | 9/2005 | Craig et al. | .......... 348/362 |
| 2006/0156364 A1 | 7/2006 | Shinkai | |

FOREIGN PATENT DOCUMENTS

| | | |
|---|---|---|
| JP | 2000092371 | 3/2000 |
| JP | 2002185846 | 6/2002 |
| JP | 2003233101 | 8/2003 |
| JP | 2004-312659 A | 11/2004 |

OTHER PUBLICATIONS

Translation of Japanese Pub. No. 2002-185846, Yohogawa, Jun. 28, 2002.*

* cited by examiner

*Primary Examiner* — Nicholas G Giles
(74) *Attorney, Agent, or Firm* — Lerner, David, Littenberg, Krumholz & Mentlik, LLP

(57) ABSTRACT

Disclosed herein is an image pickup apparatus capable of being used for preview image pickup of a predetermined scene prior to actual image pickup of the scene, including: an image pickup section configured to carry out the preview image pickup using setting data regarding image pickup; a transmission section configured to transmit image data obtained by the preview image pickup by the image pickup section and preview setting data used in the preview image pickup to an information processing apparatus which determines actual recommendation setting data recommended as actual setting data to be used in the actual image pickup; and an acquisition section configured to acquire the actual recommendation setting data determined based on the preview setting data by the information processing apparatus from the information processing apparatus.

2 Claims, 16 Drawing Sheets

| SCENE | | CUT | | PREVIEW TAKE | | | | ACTUAL TAKE | | | | PREVIEW IMAGE PICKUP SETTING DATA | | ACTUAL IMAGE PICKUP SETTING DATA | |
|---|---|---|---|---|---|---|---|---|---|---|---|---|---|---|---|
| SCENE NUMBER | SCENE TITLE | CUT NUMBER | CUT TITLE | TAKE NUMBER | TAKE MEMO | OK/NG | DATA | TAKE NUMBER | TAKE MEMO | OK/NG | DATA | RECOM- MENDATION | USE | RECOM- MENDATION | USE |
| 1 | ... | 1 | ... | 1 | ... | NG | ... | — | — | — | — | ... | ... | ... | — |
| | | | | 2 | ... | NG | ... | — | — | — | — | | ... | ... | — |
| | | 2 | ... | 1 | ... | OK | ... | — | — | — | — | ... | ... | ... | — |
| | | | | 2 | ... | NG | ... | — | — | — | — | | ... | ... | — |
| | | | | — | — | — | — | 1 | ... | OK | ... | | — | — | ... |
| | | 3 | ... | 1 | ... | OK | ... | — | — | — | — | ... | ... | ... | — |
| | | | | — | — | — | — | 1 | ... | NG | ... | | — | — | ... |
| | | | | — | — | — | — | 2 | ... | OK | ... | | — | — | ... |
| | | | | — | — | — | — | 3 | ... | NG | ... | | — | — | ... |

| SCENE | | CUT | | PREVIEW TAKE | | | | ACTUAL TAKE | | | | PREVIEW IMAGE PICKUP SETTING DATA | | ACTUAL IMAGE PICKUP SETTING DATA | |
|---|---|---|---|---|---|---|---|---|---|---|---|---|---|---|---|
| SCENE NUMBER | SCENE TITLE | CUT NUMBER | CUT TITLE | TAKE NUMBER | TAKE MEMO | OK/NG | DATA | TAKE NUMBER | TAKE MEMO | OK/NG | DATA | RECOM-MENDATION | USE | RECOM-MENDATION | USE |
| 1 | ... | 1 | ... | 1 | ... | NG | ... | — | — | — | — | ... | ... | ... | — |
| | | | | 2 | ... | NG | ... | — | — | — | — | | | | |
| | | 2 | ... | 1 | ... | OK | ... | — | — | — | — | ... | ... | ... | — |
| | | | | 2 | ... | NG | ... | — | — | — | — | | | | |
| | | 3 | ... | 1 | ... | OK | ... | 1 | ... | OK | ... | ... | ... | ... | — |
| | | | | — | — | — | — | 1 | ... | NG | ... | | — | | — |
| | | | | — | — | — | — | 2 | ... | OK | ... | | — | | ... |
| | | | | — | — | — | — | 3 | ... | NG | ... | | — | | ... |
| ... | | | | | | | | | | | | | | | |

IMAGE PICKUP APPARATUS FOR USE WITH A CONSTRUCTION TABLE

CROSS REFERENCES TO RELATED APPLICATIONS

This application is a continuation of U.S. application Ser. No. 11/789,236, filed on Apr. 24, 2007, in which the present invention contains subject matter related to Japanese Patent Application JP 2006-123530 filed in the Japan Patent Office on Apr. 27, 2006, the entire disclosures of which are incorporated herein by reference.

BACKGROUND OF THE INVENTION

1. Field of the Invention

This invention relates to an image pickup apparatus and an image pickup method as well as a program.

2. Description of the Related Art

In image production, preview image pickup which is image pickup for previewing of a predetermined scene is carried out prior to actual image pickup which is image pickup for actual use of the scene. At this time, the imaging person sets numerical information of the iris, white balance, gain and so forth upon image pickup as setting data to an image pickup apparatus based on an instruction of a producing person. Then, the imaging person performs image pickup based on the setting data to obtain an image intended by the image producing person. At this time, the setting data set in this manner are recorded on a memory card or the like.

It is to be noted that such setting data may not necessarily be recorded into a memory card or the like but may be recorded as information which forms a construction table which is recorded in a web site provided so as to share such data by those people who are involved in image production as disclosed, for example, in Japanese Patent Laid-Open No. 2004-312659. It is to be noted that the construction table is a table in which items necessary for image production are provided and various kinds of information corresponding to the items are described.

SUMMARY OF THE INVENTION

However, where the image producing person is located remotely from the imaging person, the image producing person confirms a result of preview image pickup transmitted from the imaging person. Then, if the result exhibits an image having an atmosphere different from that intended by the image producing person itself, for example, because of some difference in brightness, contrast, hue or the like, the image producing person uses a telephone or the like to transmit a notification of this to the imaging person. Then, the imaging person determines new setting data based on the substance transmitted from the producing person and the setting data recorded in a memory card or a web site and carries out actual image pickup using the setting data.

Accordingly, whether or not the result of the actual image pickup exhibits an image having an atmosphere intended by the image producing person depends much upon the skill of the imaging person.

Therefore, it is demanded to provide an image pickup apparatus and an image pickup method as well as a program wherein image pickup intended by a person who is located remotely can be carried out with certainty.

According to an embodiment of the present invention, there is provided an image pickup apparatus capable of being used for preview image pickup of a predetermined scene prior to actual image pickup of the scene, including an image pickup section configured to carry out the preview image pickup using setting data regarding image pickup, a transmission section configured to transmit image data obtained by the preview image pickup by the image pickup section and preview setting data used in the preview image pickup to an information processing apparatus which determines actual recommendation setting data recommended as actual setting data to be used in the actual image pickup, and an acquisition section configured to acquire the actual recommendation setting data determined based on the preview setting data by the information processing apparatus from the information processing apparatus.

The image pickup apparatus may be configured such that the transmission section transmits the image data obtained by the preview image pickup and the preview setting data used in the preview image pickup to the information processing apparatus for each scene, and the acquisition section acquires the actual recommendation setting data of the scene corresponding to the preview setting data determined based on the preview setting data from the information processing apparatus.

The image pickup section may further carry out the actual image pickup using the actual recommendation setting data.

The image pickup apparatus may be configured such that the image pickup apparatus further includes a variation section configured to vary the actual recommendation setting data, and that the image pickup section performs the actual image pickup using the actual recommendation setting data varied by the variation section as the actual setting data, and the transmission section transmits the actual setting data to the information processing apparatus.

The image pickup apparatus may be configured such that the image pickup apparatus further includes a variation section configured to vary preview recommendation setting data recommended as the preview setting data, and that the acquisition section acquires the preview recommendation setting data, and the image pickup section performs the preview image pickup using the preview recommendation setting data varied by the variation section.

According to another embodiment of the present invention, there is provided an image pickup method for an image pickup apparatus capable of being used for preview image pickup of a predetermined scene prior to actual image pickup of the scene, including the steps of carrying out the preview image pickup using setting data regarding image pickup, transmitting image data obtained by the preview image pickup and preview setting data used in the preview image pickup to an information processing apparatus which determines actual recommendation setting data recommended as actual setting data to be used in the actual image pickup, and acquiring the actual recommendation setting data determined based on the preview setting data by the information processing apparatus from the information processing apparatus.

According to a further embodiment of the present invention, there is provided a program for causing a computer to execute a process of carrying out preview image pickup of a predetermined scene prior to actual image pickup of the scene, the program including the steps of carrying out the preview image pickup using setting data regarding image pickup, transmitting image data obtained by the preview image pickup and preview setting data used in the preview image pickup to an information processing apparatus which determines actual recommendation setting data recommended as actual setting data to be used in the actual image pickup, and acquiring the actual recommendation setting data determined based on the preview setting data by the information processing apparatus from the information processing apparatus.

In the image pickup apparatus and the image pickup method as well as the program, preview image pickup is carried out using setting data regarding image pickup, and image data obtained by the preview image pickup and preview setting data used in the preview image pickup are transmitted to the information processing apparatus which determines actual recommendation setting data recommended as actual setting data to be used in the actual image pickup. Then, the actual recommendation setting data determined based on the preview setting data by the information processing apparatus are acquired from the information processing apparatus.

With the image pickup apparatus and the image pickup method as well as the program, image pickup intended by a person who is located remotely can be carried out with certainty.

BRIEF DESCRIPTION OF THE DRAWINGS

FIG. 2 is a view illustrating an example of a construction table;

DETAILED DESCRIPTION OF THE PREFERRED EMBODIMENT

Figure 1:
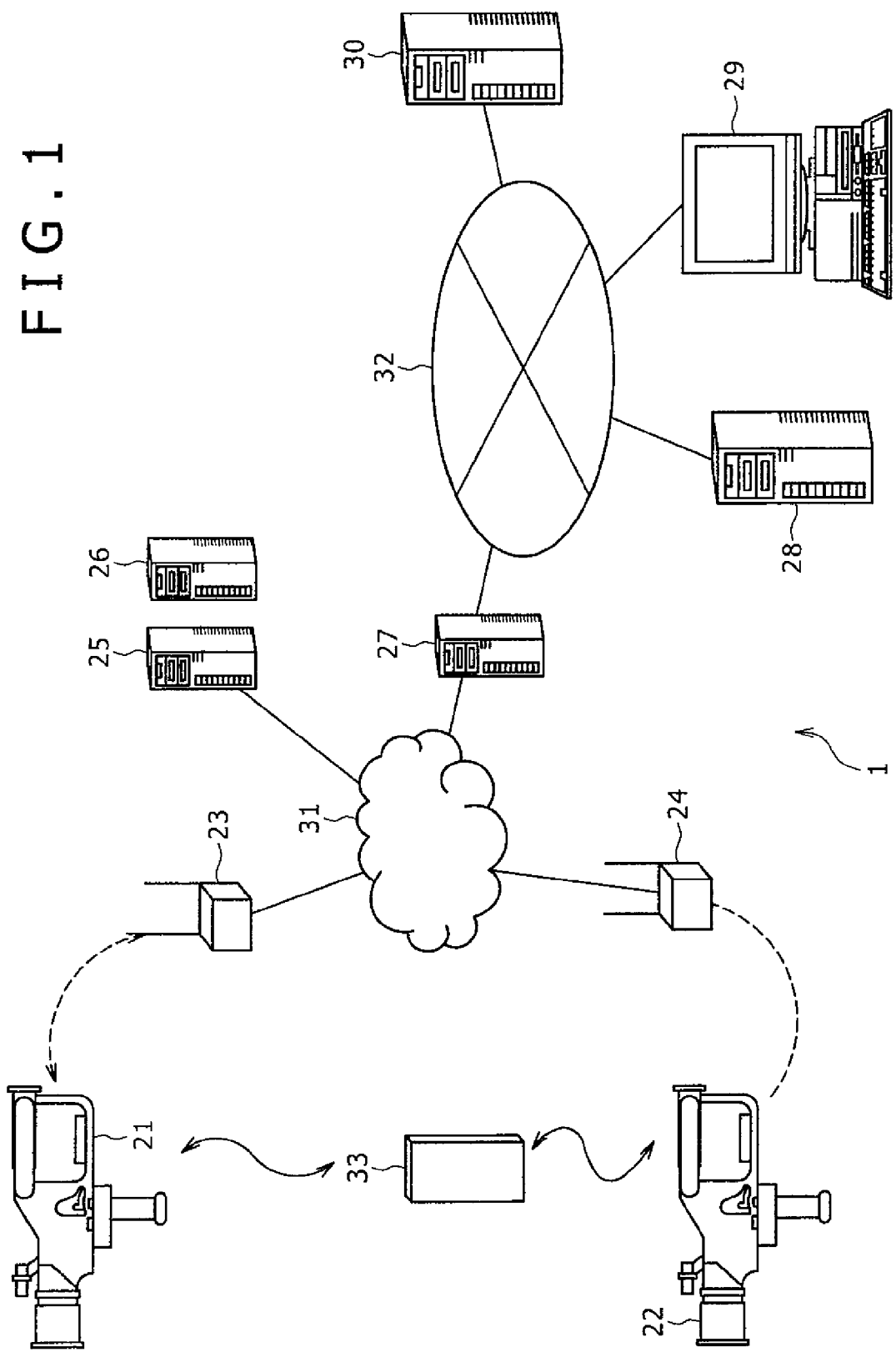
FIG. 1 is a schematic view showing an example of a configuration of a network system to which an embodiment of the present invention is applied.

Before a preferred embodiment of the present invention is described in detail, a corresponding relationship between several features recited in the accompanying claims and particular elements of the preferred embodiment described below is described. The description, however, is merely for the confirmation that the particular elements which support the invention as recited in the claims are disclosed in the description of the embodiment of the present invention. Accordingly, even if some particular element which is recited in description of the embodiment is not recited as one of the features in the following description, this does not signify that the particular element does not correspond to the feature. On the contrary, even if some particular element is recited as an element corresponding to one of the features, this does not signify that the element does not correspond to any other feature than the element.

According to an embodiment of the present invention, there is provided an image pickup apparatus (for example, a camcorder 20 of FIG. 7) capable of being used for preview image pickup of a predetermined scene prior to actual image pickup of the scene, including an image pickup section (for example, an image pickup section 304 shown in FIG. 7) configured to carry out the preview image pickup using setting data regarding image pickup, a transmission section (for example, a transmission section 307 shown in FIG. 7) configured to transmit image data obtained by the preview image pickup by the image pickup section and preview setting data used in the preview image pickup to an information processing apparatus (for example, a material utilizing apparatus 29 shown in FIG. 1) which determines actual recommendation setting data recommended as actual setting data to be used in the actual image pickup, and an acquisition section (for example, an acquisition section 301 shown in FIG. 7) configured to acquire the actual recommendation setting data determined based on the preview setting data by the information processing apparatus from the information processing apparatus.

Figure 14:
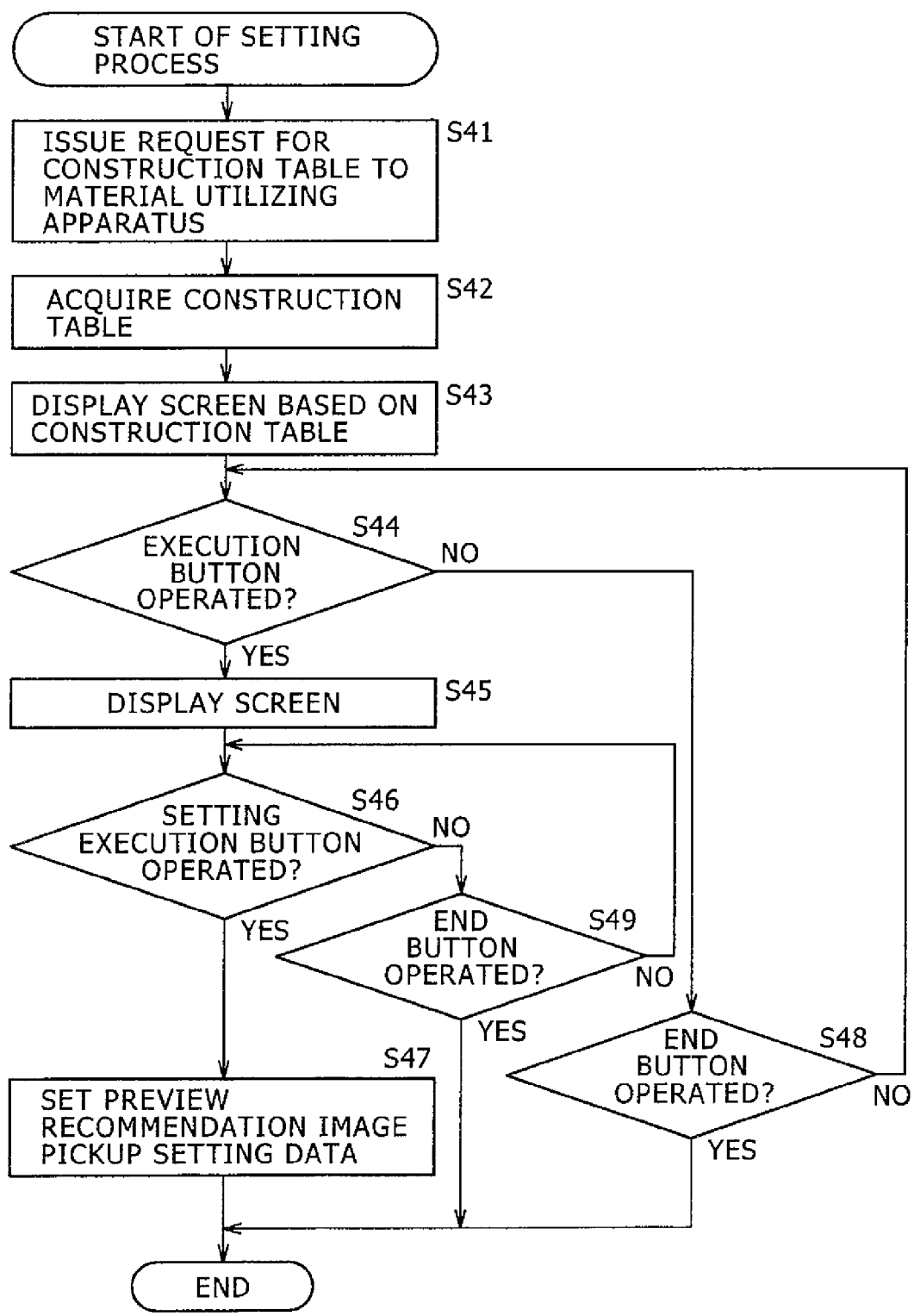
FIG. 14 is a flow chart illustrating a setting process.

The image pickup apparatus may be configured such that the transmission section transmits the image data obtained by the preview image pickup and the preview setting data used in the preview image pickup to the information processing apparatus for each scene (for example, a process at step S66 of FIG. 15), and the acquisition section acquires the actual recommendation setting data of the scene corresponding to the preview setting data determined based on the preview setting data from the information processing apparatus (for example, a process at step S42 of FIG. 14).

Figure 15:
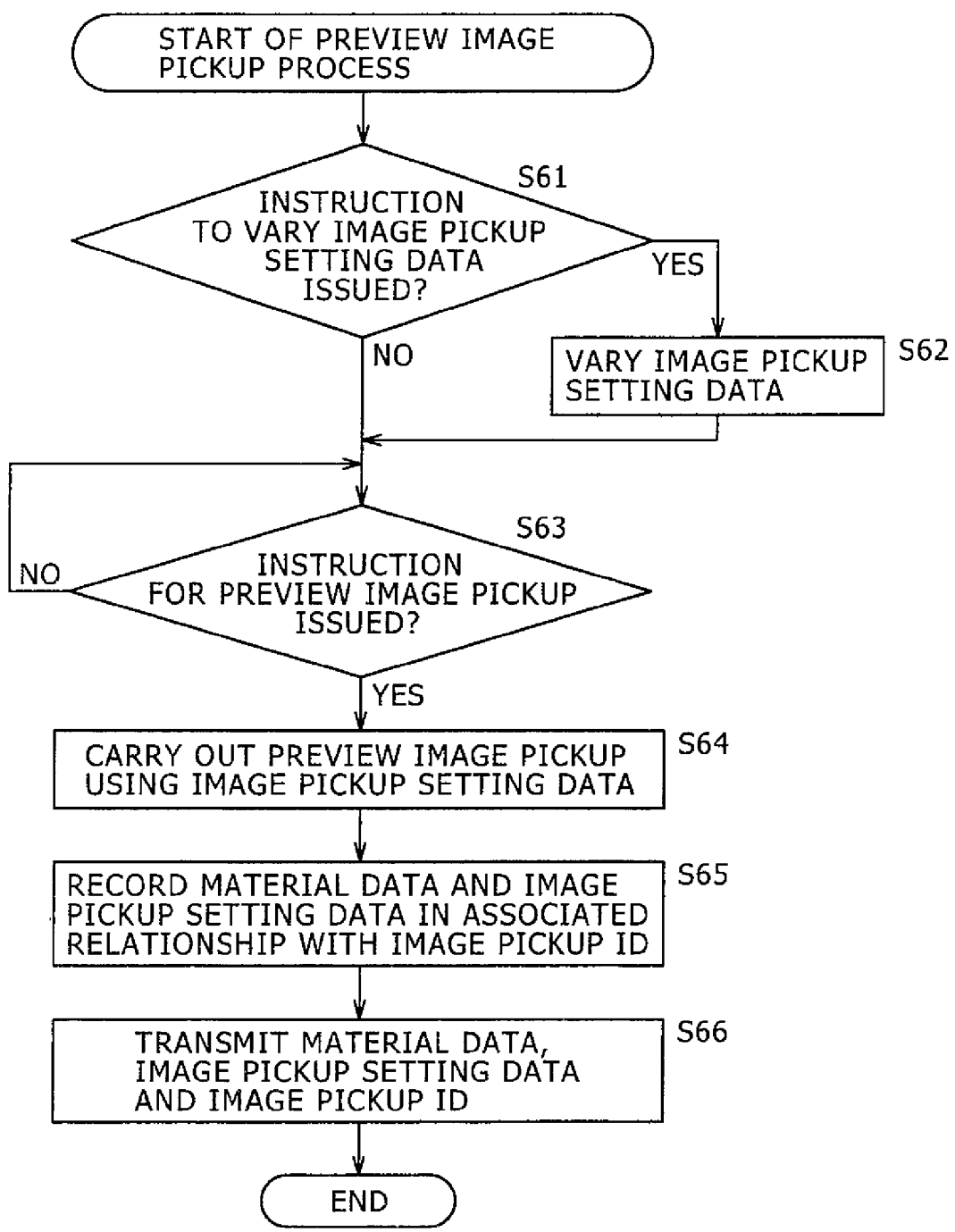
FIG. 15 is a flow chart illustrating a preview image pickup process.

The image pickup apparatus may be configured such that the image pickup apparatus further includes a variation section (for example, a setting section 303 shown in FIG. 7) configured to vary the actual recommendation setting data, and that the image pickup section performs the actual image pickup using the actual recommendation setting data varied by the variation section as the actual setting data (for example, a process similar to that at step S64 of FIG. 15), and the transmission section transmits the actual setting data to the information processing apparatus (for example, a process similar to that at step S66 of FIG. 15).

The image pickup apparatus may be configured such that the image pickup apparatus further includes a variation section (for example, a setting section 303 shown in FIG. 7) configured to vary preview recommendation setting data recommended as the preview setting data, and that the acquisition section acquires the preview recommendation setting data (for example, a process at step S42 of FIG. 14), and the image pickup section performs the preview image pickup using the preview recommendation setting data varied by the variation section (for example, a process at step S64 of FIG. 15).

Figure 7:
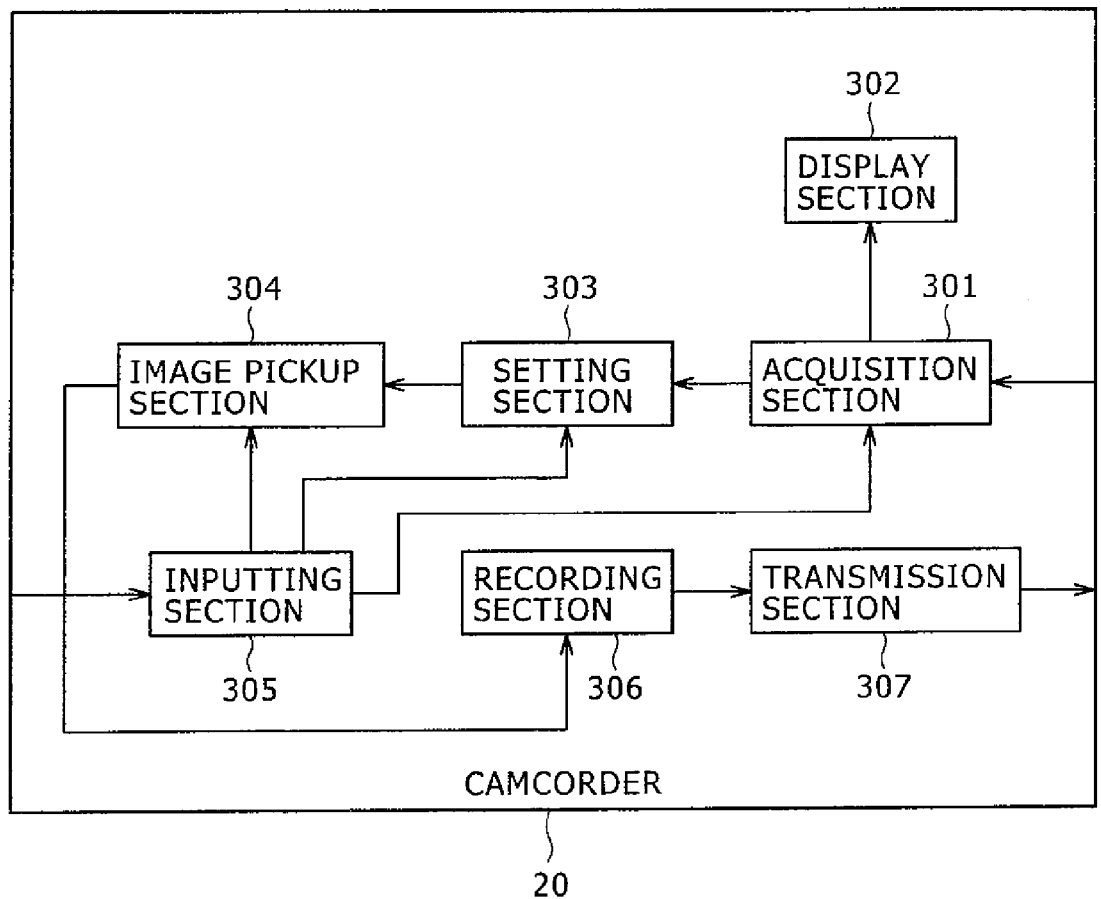
FIG. 7 is a block diagram showing an example of a functional configuration of the camcorder.

According to another embodiment of the present invention, there is provided an image pickup method for an image pickup apparatus (for example, a camcorder 20 of FIG. 7)

capable of being used for preview image pickup of a predetermined scene prior to actual image pickup of the scene, including the steps of carrying out the preview image pickup using setting data regarding image pickup (for example, a process at step S64 of FIG. 15), transmitting image data obtained by the preview image pickup and preview setting data used in the preview image pickup to an information processing apparatus (for example, a material utilizing apparatus 29 shown in FIG. 1) which determines actual recommendation setting data recommended as actual setting data to be used in the actual image pickup (for example, a process at step S66 of FIG. 15), and acquiring the actual recommendation setting data determined based on the preview setting data by the information processing apparatus from the information processing apparatus (for example, a process at step S42 of FIG. 14).

In the following, a particular embodiment of the present invention is described in detail with reference to the accompanying drawings.

FIG. 1 shows an example of a configuration of a network system 1 to which the present invention is applied.

Referring to FIG. 1, the network system 1 shown typically is a program production supporting system used for production of a television program. The process of production of a television program is basically divided into planning (construction), recording and editing (production). The planning (construction) is a step of supervising the entire production of a television program. More particularly, the planning (construction) is a step of performing planning and designing of a television program of an object of production to produce a scenario (plot) of the television program.

The recording is a step of actually performing recording at a site of production, for example, in accordance with a production instruction or a scenario. More particularly, the recording is a step of recording an image pickup (including acquisition of sound) situation together with material data such as image data and sound data of individual scenes which compose the television program. The editing is a step of editing material data obtained by recording based on a production instruction, a scenario or the like or appending, to material data obtained by recording or material data after editing, some other information (CG/SI (Computer Graphics/SuperImpose), narration, material images, music and so forth) which is not obtained by the recording to produce material data completed as a television program.

The network system 1 of FIG. 1 is a program production supporting system for supporting works at such steps as described above. The network system 1 includes a pair of camcorders 21 and 22, a pair of access points 23 and 24, a pair of servers 25 and 26, a firewall 27, a material server 28, a material utilizing apparatus 29, a completed material data server 30, a network 31, and an intranet 32.

The camcorders 21 and 22 are used for recording of a news program of a television program, a sports game or an image work such as a movie. In particular, the camcorders 21 and 22 are used to carry out, based on a construction table (hereinafter described with reference to FIG. 2) received from the material utilizing apparatus 29 through the network 31, preview image pickup which is image pickup for previewing of a predetermined cut of an image work prior to actual image pickup of the cut.

Further, the camcorders 21 and 22 record material data obtained as a result of preview image pickup and setting data (hereinafter referred to as image pickup setting data) relating to image pickup used in the preview image pickup on a removable medium 33 such as, for example, a magnetic disk, an optical disk such as a DVD (Digital Versatile Disc), a magneto-optical disk, a memory card or a removable hard disk drive.

It is to be noted that, in the following description, the image pickup setting data include a master gain Gm, a white balance Wr, Wg and Wb of red (R), green (G) and blue (B), nine coefficients $a_{ij}$ (i=1, 2, 3, j=1, 2, 3) used in arithmetic operation of a linear matrix, two different coefficients $b_n$ and $c_n$ (n=1, 2, for the determination of a value (hereinafter referred to as gradation setting value) set as a gradation and data representative of the black level B. However, the image pickup setting data are not limited to them but may be any setting data only if they relate to image pickup and are used in image pickup.

Further, the camcorders 21 and 22 perform actual image pickup based on a construction table updated based on image pickup setting data (hereinafter referred to as preview use image pickup setting data) used upon preview image pickup and received from the material utilizing apparatus 29. Then, the camcorders 21 and 22 record material data obtained in the actual image pickup and image pickup setting data (hereinafter referred to actual use image pickup setting data) used in the actual image pickup on the removable medium 33 or the like.

Further, the camcorders 21 and 22 establish a connection to the access point 23 or 24 through radio communication and transmits material data and image pickup setting data used upon acquisition of the material data to another apparatus such as the material utilizing apparatus 29 through the network 31 such as the Internet connected to the access point 23 or 24.

Further, the camcorders 21 and 22 produce information useful upon information processing at a later stage such as information relating to the recording based on an input of a user and associate the produced information as meta data with the material data obtained on the camcorders 21 and 22.

The servers 25 and 26 are connected to the camcorders 21 and 22 through the access point 23 or 24 and the network 31. Material data acquired by the camcorders 21 and 22 are supplied to and recorded by the servers 25 and 26 as occasion demands.

The intranet 32 is connected to the network 31 through the firewall 27. The firewall 27 inhibits illegal accessing from the network 31 to the intranet 32.

The material server 28, material utilizing apparatus 29 and completed material data server 30 are connected to the intranet 32.

The material server 28 accumulates material data supplied thereto from the material utilizing apparatus 29 through the intranet 32. The material utilizing apparatus 29 produces a construction table based on an instruction of the user and records the produced construction table. Further, the material utilizing apparatus 29 reads out the construction table recorded therein and transmits the construction table to the camcorder 21 or 22 through the intranet 32, firewall 27, network 31 and access point 23 or 24.

Further, the material utilizing apparatus 29 records material data transmitted thereto from the camcorder or 22 through the access point 23 or 24, network 31, firewall 27 and intranet 32. Further, the material utilizing apparatus 29 supplies the material data recorded therein to the material server 28.

Furthermore, the material utilizing apparatus 29 updates the construction table based on image pickup setting data transmitted thereto from the camcorder 21 or 22. Further, the material utilizing apparatus 29 reads out the material data stored therein or material data accumulated in the material server 28 and produces completed material data. The material utilizing apparatus 29 supplies the produced completed material data to the completed material data server through the intranet 32. The completed material data server 30 accumulates the completed material data supplied thereto from the material utilizing apparatus 29.

It is to be noted that, where there is no necessity to distinguish the camcorders 21 and 22 from each other, they are collectively referred to as camcorders 20. Further, where there is no necessity distinguish the access points 23 and 24 from each other, they are collectively referred to access points 34.

Now, a construction table is described with reference to FIG. 2.

The construction table of FIG. 2 describes major items of "scene", "cut", "preview take", "actual take", . . . , "preview image pickup setting data" and "actual image pickup camera setting data" provided as items necessary for image production and each composed of small items. The construction table further describes various kinds of information corresponding to the large items.

The large item "scene" includes small items "scene number" and "scene title". Information corresponding to the "scene number" is the number applied to each of scenes which compose an image work. Information corresponding to the small item "scene title" is the title of each scene.

The large item "cut" includes small items "cut number" and "cut title". Information corresponding to the small item "cut number" is the number applied to each of cuts which compose a scene. Information corresponding to the small item "cut title" is the title applied to each of the cuts which compose the scene.

The large item "preview take" includes small items "take number", "take memo", "OK/NG" and "data". Information corresponding to the small item "take number" is the number applied to each of takes of a cut upon preview image pickup. Information corresponding to the small item "take memo" is information relating to the take upon preview image pickup.

Information corresponding to the small item "OK/NG" is "OK" or "NG" representing an evaluation of a take upon preview image pickup. For example, the information corresponding to the small item "OK/NG" of a take whose evaluation is, for example, highest is "OK", and the information corresponding to the small item "OK/NG" of the other takes is "NG". Further, information corresponding to the small item "data" is an address into which material data of a take upon preview image pickup is recorded and/or a material ID of the material data. It is to be noted that the material ID may be, for example, a UMID (Unique Material IDentifier) which is an identifier unique to material data for identifying each material data global-uniquely and defined by the SMPTE (Society of Motion Picture and Television Engineers).

The large item "actual take" includes small items "take number", "take memo", "OK/NG" and "data" similarly to the large item "preview take". Information corresponding to the small item "take number" is the number applied to each of takes of a cut upon actual image pickup. Information corresponding to the small item "take memo" is information relating to a take upon actual image pickup.

Information corresponding to the small item "OK/NG" is "OK" or "NG" representing an evaluation of a take upon actual image pickup. Further, information corresponding to the small item "data" is an address into which material data of a take upon actual image pickup is recorded and/or a material ID unique to the material data.

The large item "preview image pickup setting data" includes small items "recommendation" and "use". Information corresponding to the small item "recommendation" is image pickup setting data (hereinafter referred to as preview recommendation image pickup setting data) recommended as image pickup setting data for preview image pickup. Information corresponding to the small item "use" is preview use image pickup setting data.

The large item "actual image pickup setting data" includes small items "recommendation" and "use" similarly to the large item "preview image pickup setting data". Information corresponding to the small item "recommendation" is image pickup setting data (hereinafter referred to as actual recommendation image pickup setting data) recommended as image pickup setting data for actual image pickup. Information corresponding to the small item "use" is actual use image pickup setting data.

As described above, in the construction table of FIG. 2, the configuration of scenes and cuts divided from the substance of an image work, the title and explanation of the scenes and the cuts, image pickup setting data and other incidental information are represented in the form of a table. In other words, although the construction table is similar to a picture continuity, it includes various kinds of information necessary for production of an image work.

Now, a preview image pickup work which is a work flow of workers of different steps when preview image pickup of an image work is performed in the network system 1 of FIG. 1 is described with reference to FIG. 3.

At step S1, a planner who is a worker at the planning step would use the material utilizing apparatus 29 to produce the construction table of FIG. 2 and record the construction table into the material utilizing apparatus 29.

After the process at step S1, the processing advances to step S2, at which a preview imaging person who performs image pickup of an image work uses a camcorder 20 to acquire the construction table produced at step S1 from the material utilizing apparatus 29 through the network 31.

After the process at step S2, the processing advances to step S3, at which the preview imaging person would perform preview image pickup based on the preview recommendation image pickup setting data which are information corresponding to the small item "recommendation" of the large item "preview image pickup setting data" corresponding to a cut of an object of the preview image pickup from within the information which composes the construction table. Thus, the preview imaging person will obtain material data of the cut of the object of the preview image pickup as a result of the preview image pickup.

After the process at step S3, the processing advances to step S4, at which the preview imaging person would use the camcorder 20 to transmit the preview image pickup result and the image pickup setting data upon the preview image pickup to the material utilizing apparatus 29 and transmit an ID (hereinafter referred to as image pickup ID) unique to the image pickup result to the material utilizing apparatus 29.

The image pickup ID is information including the scene number of a scene in which the cut of the image pickup object is included and the cut number of the cut as well as appended information representing preview image pickup or actual image pickup. For example, where preview image pickup of a cut whose scene number is "1" and whose cut number is "2" is performed, "preview 12" is transmitted as the image pickup ID.

Since the image pickup ID is transmitted together with the preview image pickup result in this manner, the material utilizing apparatus 29 side can recognize the associated relationship between the preview image pickup result and the number which is information corresponding to the small item "cut number" described in the construction table.

At step S5, the planner would record the preview image pickup result transmitted from the camcorder 20 at step S4 into the material utilizing apparatus 29. Further, the planner would record the image pickup setting data upon preview image pickup transmitted from the camcorder 20 as preview use image pickup setting data which is information corresponding to the small item "use" of the large item "preview image pickup setting data" corresponding to the image pickup ID transmitted together with the preview image pickup result in the construction table recorded in the material utilizing apparatus 29. The preview image pickup work is completed therewith.

Figure 4:
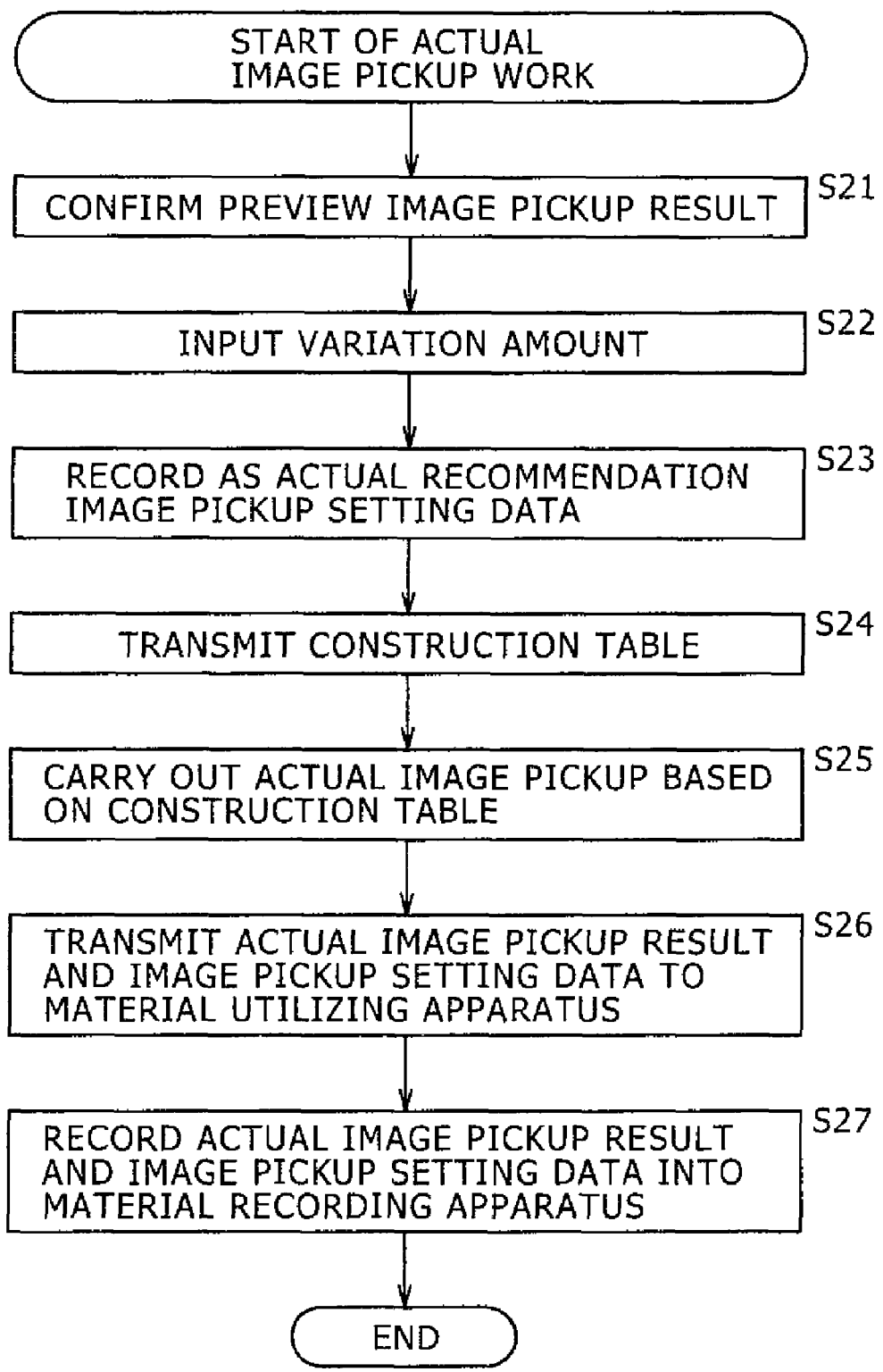
FIG. 4 is a flow chart illustrating an actual image pickup work.

Now, an actual image pickup work which is a work flow of workers of different steps when actual image pickup of an image work is performed in the network system 1 of FIG. 1 is described with reference to FIG. 4.

Figure 3:
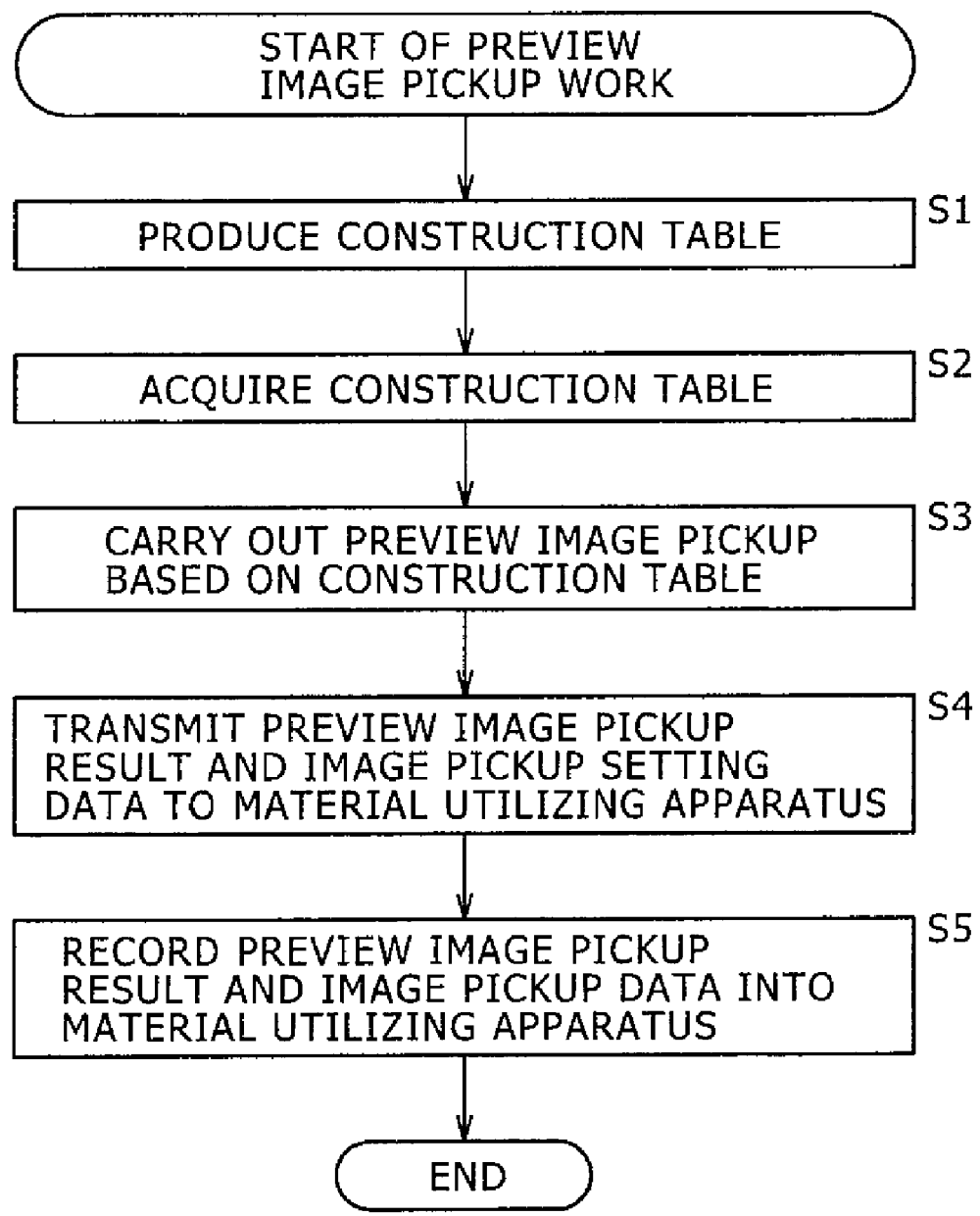
FIG. 3 is a flow chart illustrating a preview image pickup work.

At step S21, the planner would cause the material utilizing apparatus 29 to display an image corresponding to a preview image pickup result recorded at step S5 of FIG. 3 and confirms the brightness, hue, contrast and so forth of the image by the naked eye. Thereafter, the processing advances to step S22. At step S22, the planner would input variation amounts to the values representing the brightness, hue and so forth to the material utilizing apparatus 29 and cause the material utilizing apparatus 29 to display an image corresponding to image data approximate to image data obtained as a result of image pickup to be performed using the image pickup setting data varied based on the variation amounts.

Then, the planner would input, while watching the displayed image, variation amounts to the material utilizing apparatus 29 so that the image approaches an image intended by the planner itself.

After the process at step S22, the processing advances to step S23, at which the planner would issue a determination instruction when an image most close to the image intended by the planner itself is displayed on the material utilizing apparatus 29. Consequently, the image pickup setting data varied based on the currently inputted variation amounts are recorded as actual recommendation image pickup setting data which are information corresponding to the cut number corresponding to the image displayed at step S21 in the construction table and corresponding to the small item "recommendation" of the large item "actual image pickup setting data" into the material utilizing apparatus 29.

In short, the planner would cause the image pickup setting data after the variation into the place of the construction table which corresponds to the cut number corresponding to the image displayed at step S21 and corresponds to the small item "recommendation" of the large item "actual image pickup setting data".

After the process at step S23, the processing advances to step S24, at which the planner would use the material utilizing apparatus 29 to transmit the construction table, into which the actual recommendation image pickup setting data is entered at step S23, to the camcorder 20 through the network 31.

After the process at step S24, the processing advances to step S25, at which an actual imaging person who performs actual image pickup would use the camcorder 20 to perform actual image pickup based on the construction table transmitted at step S24. In particular, the actual imaging person would set image pickup data based on the actual recommendation image pickup setting data of the construction table and perform actual image pickup. Then, the actual imaging person would acquire material data of a cut same as the cut corresponding to the preview image pickup result as a result of the actual image pickup.

Since the construction table, in which the actual recommendation image pickup setting data varied so that an image closest to the image intended by the planner is obtained based on a result of the preview image pickup of the same cut, is transmitted from the material utilizing apparatus 29 in this manner, the actual imaging person can obtain material data of the image closest to the image intended by the planner as a result of the actual image pickup by setting image pickup setting data based on the actual recommendation image pickup setting data and performing actual image pickup based on the set image pickup setting data.

At step S26, the actual imaging person would use the camcorder 20 to transmit the actual image pickup result and the image pickup setting data upon actual image pickup to the material utilizing apparatus 29 together with the image pickup ID of the actual image pickup result.

After the process at step S26, the processing advances to step S27, at which the planner would cause the material utilizing apparatus 29 to record the actual image pickup result transmitted at step S26 and record the image pickup setting data upon actual image pickup transmitted from the camcorder 20 as the actual image pickup setting data which is information corresponding to the small item "use" of the large item "actual image pickup setting data" corresponding to the image pickup ID transmitted together with the actual image pickup result in the construction table recorded in the material utilizing apparatus 29. The processing of the actual image pickup work is ended therewith.

Figure 5:
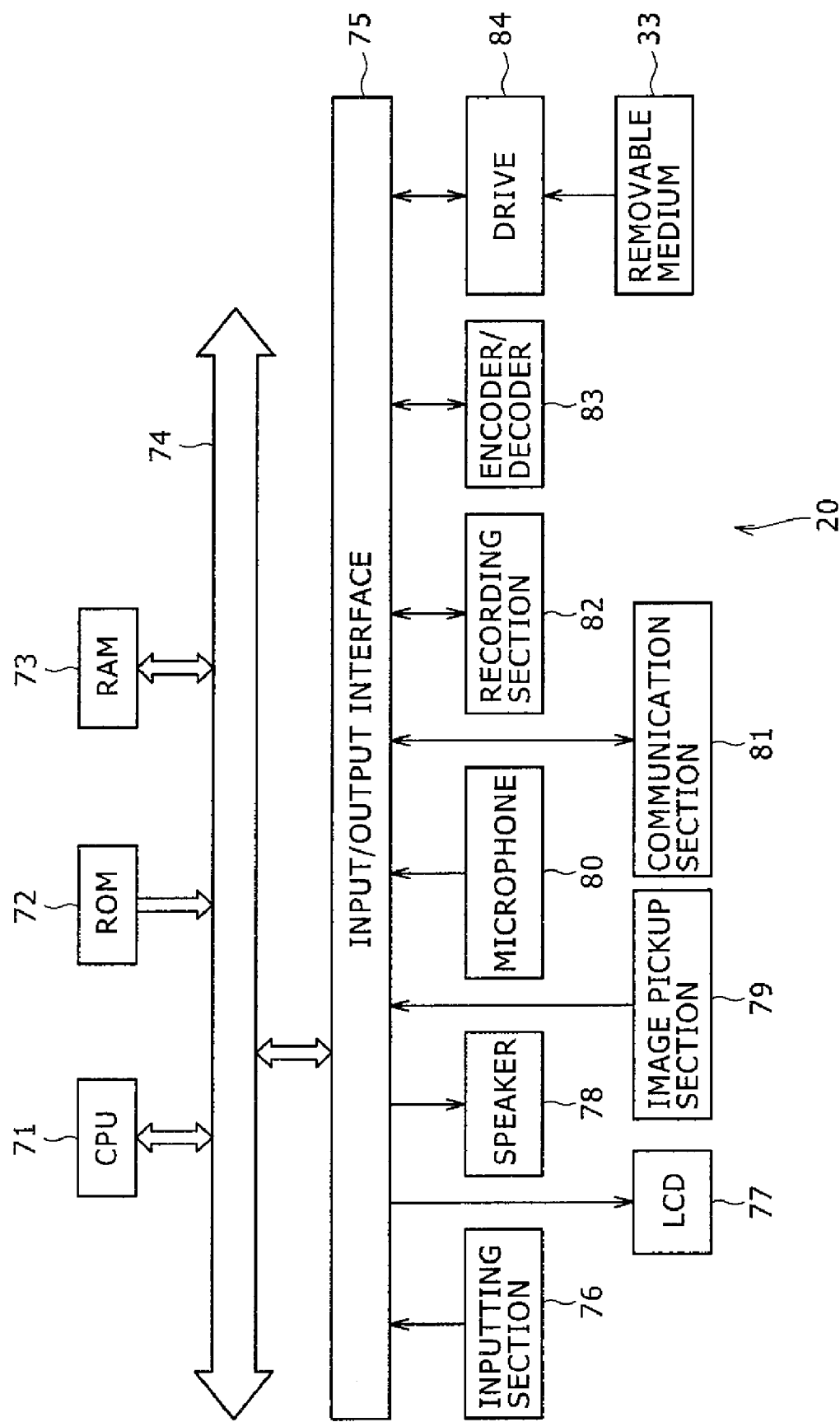
FIG. 5 is a block diagram showing an example of a hardware configuration of a camcorder.

FIG. 5 shows an example of a hardware configuration of the camcorder 20.

Referring to FIG. 5, a central processing unit (CPU) 71 executes various processes in accordance with a program stored in a ROM (Read Only Memory) 72 or a program loaded in a RAM (Random Access Memory) 73. Also data necessary for the CPU 71 to execute the processes are suitably stored into the RAM 73.

The CPU 71, ROM 72 and RAM 73 are connected to one another by a bus 74. Also an input/output interface 75 is connected to the bus 74.

An inputting section 76 including various buttons such as a cross key, a determination button and a menu button, switches and so forth, an LCD (Liquid Crystal Display) unit 77, a speaker 78, an image pickup section 79 including a CCD (Charge Coupled Device) image pickup device or the like, a microphone 80 for fetching a sound signal, and a communication section 81 for performing a communication process through an access point 34.

Also a recording section 82 is connected to the input/output interface 75 and may include a hard disk. The recording section 82 records image data obtained by image pickup by the image pickup section 79, sound data collected by the microphone 80 and so forth as material data. Further, the recording section 82 reproduces material data recorded already therein and outputs image data from within the material data to the LCD unit 77 so that an image corresponding to the image data is displayed on the LCD unit 77. Meanwhile, the recording section 82 outputs sound data from within the material data to the speaker 78 so that sound corresponding to the sound data is outputted from the speaker 78.

Also an encoder/decoder 83 is connected to the input/output interface 75 and encodes or decodes image data in accordance with an MPEG (Moving Picture Experts Group) or JPEG (Joint Photographic Coding Experts Group) method.

Also a drive 84 is connected to the input/output interface 75. When a removable medium 33 is loaded in the drive 84, the drive 84 drives the removable medium 33 to acquire a program, data or the like recorded on the removable medium 33. The acquired program or data is transferred to and recorded by the recording section 82 as occasion demands.

Further, the drive 84 records image data obtained by image pickup by the image pickup section 79, sound data collected by the microphone 80 and other data as material data on the removable medium 33.

Figure 6:
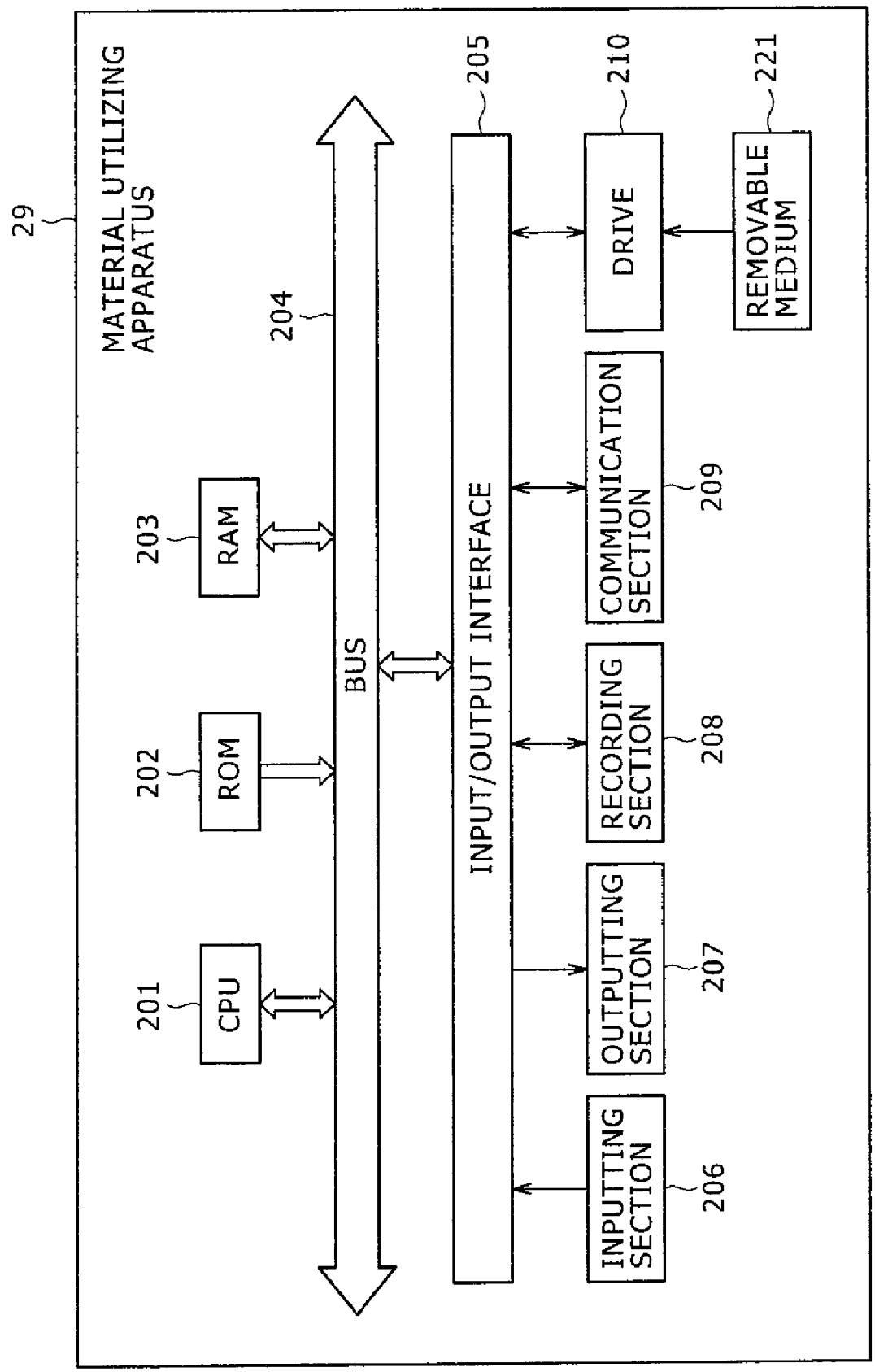
FIG. 6 is a block diagram showing an example of a hardware configuration of a material utilizing apparatus.

FIG. 6 shows an example of a hardware configuration of the material utilizing apparatus 29 shown in FIG. 1.

Referring to FIG. 6, a CPU 201 executes various processes in accordance with a program stored in a ROM 202 or a recording section 208. A program to be executed by the CPU 201, data and so forth are suitably stored into a RAM 203. The CPU 201, ROM 202 and RAM 203 are connected to one another by a bus 204.

Also an input/output interface 205 is connected to the CPU 201 through the bus 204. An inputting section 206 including a keyboard, a mouse, a microphone, a reception section for receiving an instruction transmitted from a remote controller not shown and so forth and an outputting section 207 including a display unit, a speaker and so forth are connected to the input/output interface 205. The CPU 201 executes various processes in accordance with an instruction inputted thereto from the input section 206. Then, the CPU 201 outputs a result of the processes to an outputting section 207. For example, the CPU 201 produces image data for displaying various screens and causes the outputting section 207 to display a screen based on the image data.

The recording section 208 connected to the input/output interface 205 includes, for example, a hard disk and records a program to be executed by the CPU 201 and various data. Also a communication section 209 is connected to the input/output interface 205 and communicates with an external apparatus through the intranet 32. Further, the communication section 209 may acquire a program through the intranet 32 and record the program on the recording section 208.

Also a drive 210 is connected to the input/output interface 205. When a removable medium 221 such as a magnetic disk, an optical disk, a magneto-optical disk or a semiconductor memory is loaded in the drive 210, the drive 210 drives the removable medium 221 to acquire a program, data or the like recorded on the removable medium 221. The acquired program or data is transferred to and recorded into the recording section 208 as occasion demands.

FIG. 7 shows an example of a functional configuration of the camcorder 20.

Referring to FIG. 7, the camcorder 20 shown includes an acquisition section 301, a display section 302, a setting section 303, an image pickup section 304, an inputting section 305, a recording section 306 and a transmission section 307. It is to be noted that the acquisition section 301 and the transmission section 307 correspond, for example, to the communication section 81 shown in FIG. 5, and the display section 302 corresponds, for example, to the LCD unit 77. Further, the setting section 303 and the inputting section 305 correspond, for example, to the CPU 71, and the image pickup section 304 corresponds, for example, to the image pickup section 79. Furthermore, the recording section 306 corresponds, for example, to the recording section 82.

The acquisition section 301 issues a request for acquisition of a construction table to the material utilizing apparatus 29 in response to an instruction from the inputting section 305 and acquires a construction table transmitted thereto from the material utilizing apparatus 29 in response to the request. The acquisition section 301 produces image data for displaying various screens or the like relating to image pickup setting data based on the construction table and supplies the produced image data to the display section 302.

The display section 302 displays various screens relating to image pickup setting data based on image data from the acquisition section 301.

The setting section 303 extracts, from among image pickup setting data included in a construction table acquired by the acquisition section 301, image pickup setting data designated so as to be set by the user. Then, the setting section 303 sets the extracted image pickup setting data as image pickup setting data to be used for image pickup by the image pickup section 304 in accordance with an instruction from the inputting section 305. Further, the image pickup section 304 varies the set image pickup setting data in accordance with an instruction from the inputting section 305. The setting section 303 supplies the set image pickup setting data to the image pickup section 304.

The image pickup section 304 carries out image pickup using image pickup setting data from the setting section 303 in response to an instruction from the inputting section 305. Then, the image pickup section 304 supplies material data of a predetermined cut obtained by the image pickup and image pickup setting data from the setting section 303 to the recording section 306 together with an image pickup ID corresponding to the material data. The inputting section 305 accepts an instruction generated by an operation of the inputting section 76 shown in FIG. 5 by the user and issues a suitable instruction to the acquisition section 301, setting section 303 or image pickup section 304 in response to the accepted instruction.

In particular, for example, the inputting section 305 accepts an instruction to display any of various screens relating to image setting data from the user and instructs the acquisition section 301 to display the screen in accordance with the accepted instruction. The inputting section 305 accepts an instruction to set image pickup setting data from the user and instructs the setting section 303 to set the image pickup setting data in accordance with the accepted instruction.

Further, the inputting section 305 accepts an instruction to vary image pickup setting data from the user and instructs the setting section 303 to vary currently set image pickup setting data in accordance with the accepted instruction. Further, the inputting section 305 accepts an instruction to pick up an image from the user and instructs the image pickup section 304 to pick up an image in accordance with the accepted instruction.

The recording section 306 records material data and image pickup setting data in an associated relationship with an image pickup ID from the image pickup section 304. Further, the recording section 306 reads out material data and image pickup setting data recorded already therein in an associated relationship with an image pickup ID together with the associated image pickup ID. Then, the recording section 306 supplies the read out image pickup ID, material data and image pickup setting data to the transmission section 307. The transmission section 307 transmits the image pickup ID, material data and image pickup setting data from the recording section 306 to the material utilizing apparatus 29.

Now, several examples of a screen relating to image pickup setting data to be displayed on the display section 302 are described with reference to FIGS. 8 to 10.

Figure 8:
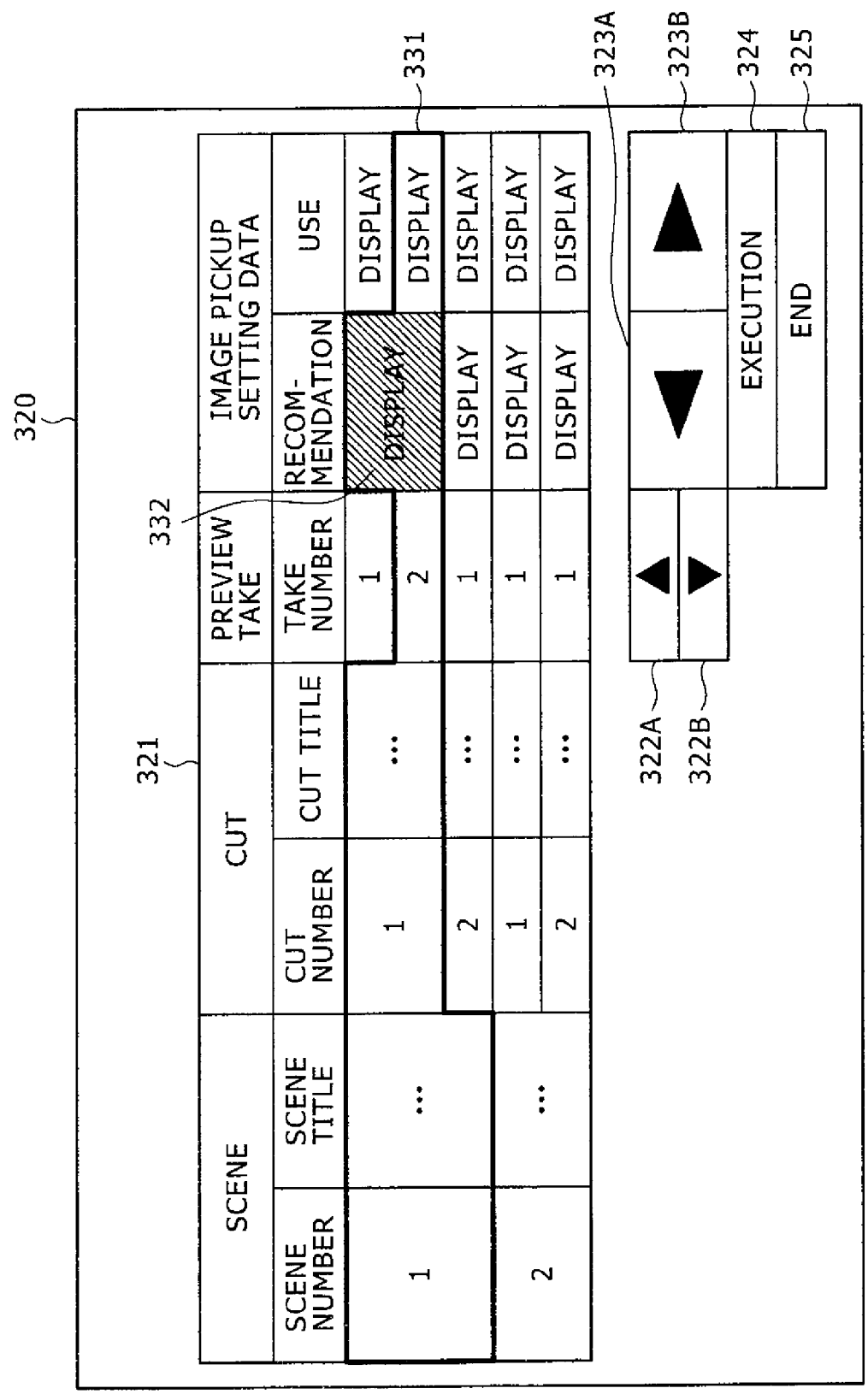
FIG. 8 is a view showing an example of a screen for displaying preview recommendation image pickup setting data and preview use image pickup setting data.

FIG. 8 illustrates an example of a screen 320 for causing preview recommendation image pickup setting data or preview use image pickup setting data included in a construction table to be displayed. It is to be noted that, while an example of the screen 320 for causing preview recommendation image pickup setting data or preview use image pickup setting data included in a construction table to be displayed is described below with reference to FIG. 8, also a screen for causing actual recommendation image pickup setting data or actual use image pickup setting data is configured in a similar manner.

Referring to FIG. 8, the screen 320 shown includes a table 321, an upward button 322A and a downward button 322B, a leftward button 323A and a rightward button 323B, an execution button 324, and an end button 325.

The table 321 describes a large item "scene" including small items "scene number" and "scene title", another large item "cut" including small items "cut number" and "cut title", a further large item "preview take" including a small item "take number", a still further large item "image pickup setting data" including small items "recommendation" and "use", and corresponding information.

The information corresponding to the small items "scene number" and "scene title", small items "cut number" and "cut title" and small item "take number" is information corresponding to the small items "scene number" and "scene title", small items "cut number" and "cut title" and small item "take number" which composes the large item "preview take" in the construction table of FIG. 2, respectively. It is to be noted that "display" is described as information corresponding to the small items "recommendation" and "use".

The upward button 322A is operated to move a cursor 331 provided on the table 321 in an upward direction when the user operates the inputting section 76 shown in FIG. 5. The downward button 322B is operated by the user to move the cursor 331 in a downward direction.

The leftward button 323A is operated by the user to move a selection region 332 for selecting one of the two displays "display" which are information displayed in the cursor 331 corresponding to the small items "recommendation" and "use" in a leftward direction. The rightward button 323B is operated by the user to move the selection region 332 in a rightward direction.

The execution button 324 is operated by the user to display image pickup setting data corresponding to "display" which is information selected by the selection region 332. The end button 325 is operated by the user to end the display of the screen 320.

In the example of FIG. 8, the cursor 331 is provided on the table 321 such that it surrounds "1" which is information corresponding to the small item "scene number", information corresponding to the small item "scene title" corresponding to "1", "1" which is information corresponding to the small item "cut number", information corresponding to the small item "cut title" corresponding to "1", "2" which is information corresponding to the small item "take number" and "display" which is information corresponding to the small items "recommendation" and "use" corresponding to "2".

Further, in the example of FIG. 8, the selection region 332 is provided so as to select "display" which is information displayed in the cursor 331 corresponding to the small item "recommendation".

Figure 9:
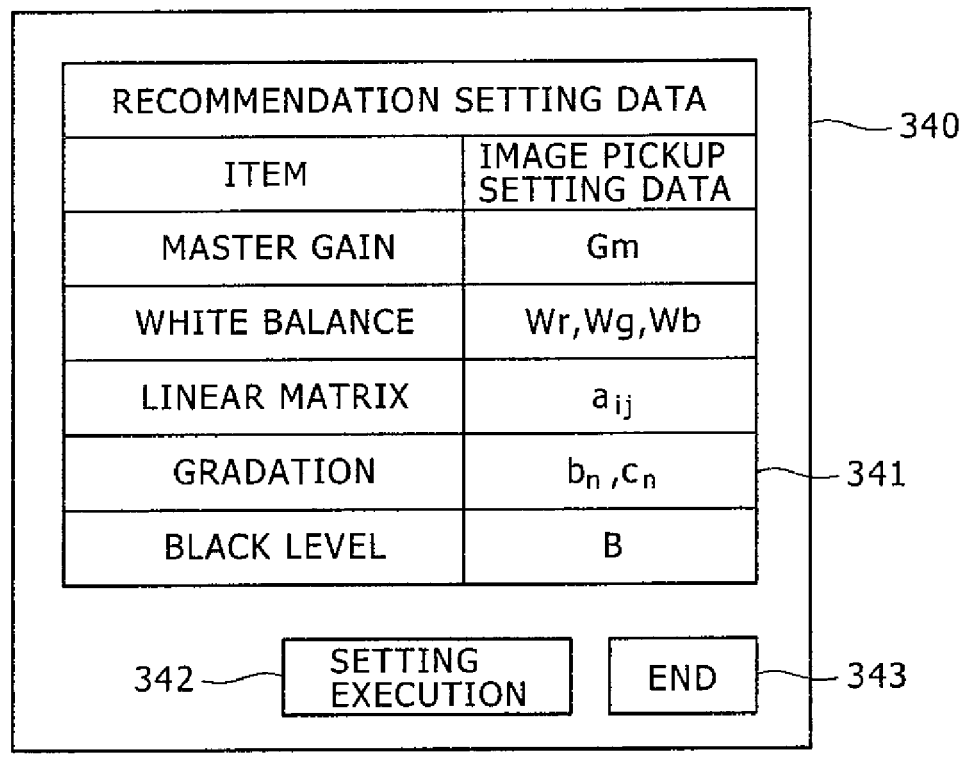
FIG. 9 is a view showing an example of a screen for setting preview recommendation image pickup setting data.

In this instance, if the execution button 324 is operated by the user, then a screen 340 shown in FIG. 9 is displayed on the display section 302.

Referring to FIG. 9, the screen 340 includes an information display section 341, a setting execution button 342 and an end button 343.

In the information display section 341, preview recommendation image pickup setting data which is information corresponding to the small item "recommendation" of the large item "preview image pickup setting data" of the construction table of FIG. 2 corresponding to the selection region 332 is displayed for each item. In particular, in the information display section 341, a master gain Gm, white balance Wr, Wg and Wb, nine coefficients $a_{ij}$, coefficients $b_n$ and $c_n$, and data representing the black level B from among image pickup setting data are displayed in an associated relationship with items "master gain", "white balance", "linear matrix", "gradation" and "black level") representative of types of image pickup setting data.

It is to be noted that, while, in the example of FIG. 9, the data representing the master gain Gm, white balance Wr, Wg and Wb, nine coefficients $a_{ij}$, coefficients $b_n$ and $c_n$, and data representing the black level B are represented by alphabetical letters, the data mentioned are actually in the form of numerical values. This similarly applies to FIG. 6.

Further, where preview recommendation image pickup setting data corresponding to the selection region 332 is not described in the construction table, nothing is displayed as information corresponding to the items in the information display section 341.

The setting execution button 342 is operated by the user to set preview recommendation image pickup setting data displayed in the information display section 341 as image pickup setting data to be used for preview image pickup. The end button 343 is operated by the user to end the display of the screen 340.

Figure 10:
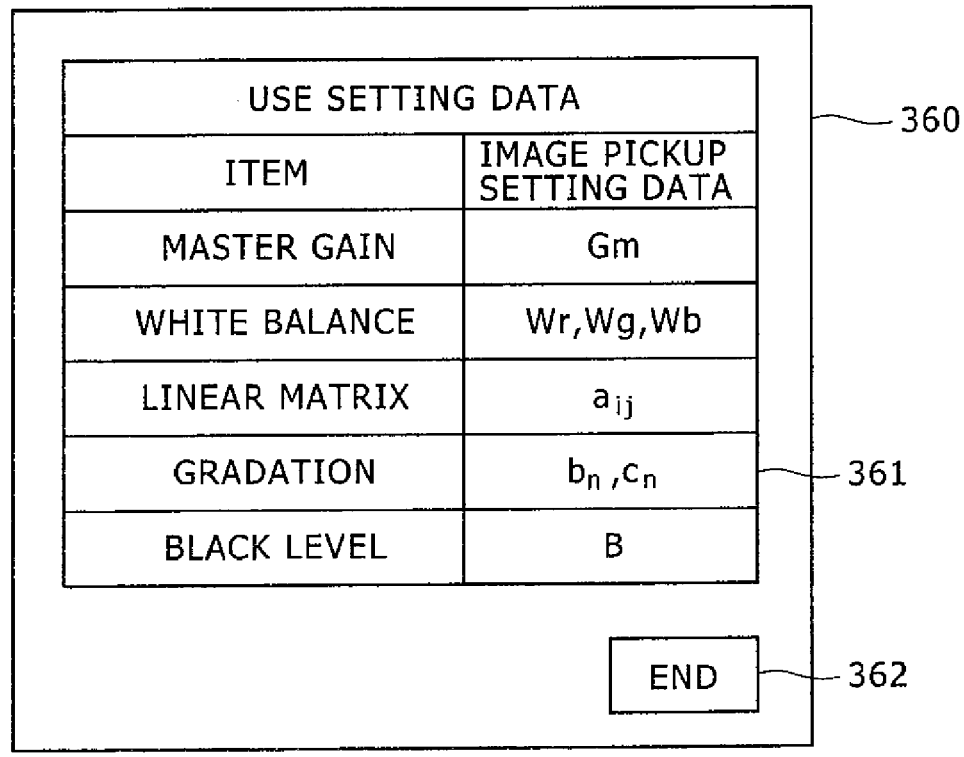
FIG. 10 is a view showing an example of a screen for displaying preview use image pickup setting data.

Referring back to FIG. 8, if the user moves the selection region 332 on the screen 320 to "display" which is information displayed in the cursor 331 corresponding to the small item "use" and then operates the execution button 324, then a screen 360 of FIG. 10 is displayed on the display section 302.

Referring to FIG. 10, the screen 360 shown includes an information display section 361 and an end button 362.

In the information display section 361, preview use image pickup setting data which is information corresponding to the small item "use" of the large item "preview image pickup setting data" of the construction table of FIG. 2 corresponding to the selection region 332 is displayed for each item similarly as in the information display section 341. It is to be noted that, where preview use image pickup setting data corresponding to the selection region 332 is not described in the construction table, that is, where no preview image pickup is performed as yet, nothing is displayed as information corresponding to the items in the information display section 361. The end button 362 is operated by the user to end the display of the screen 360.

Figure 11:
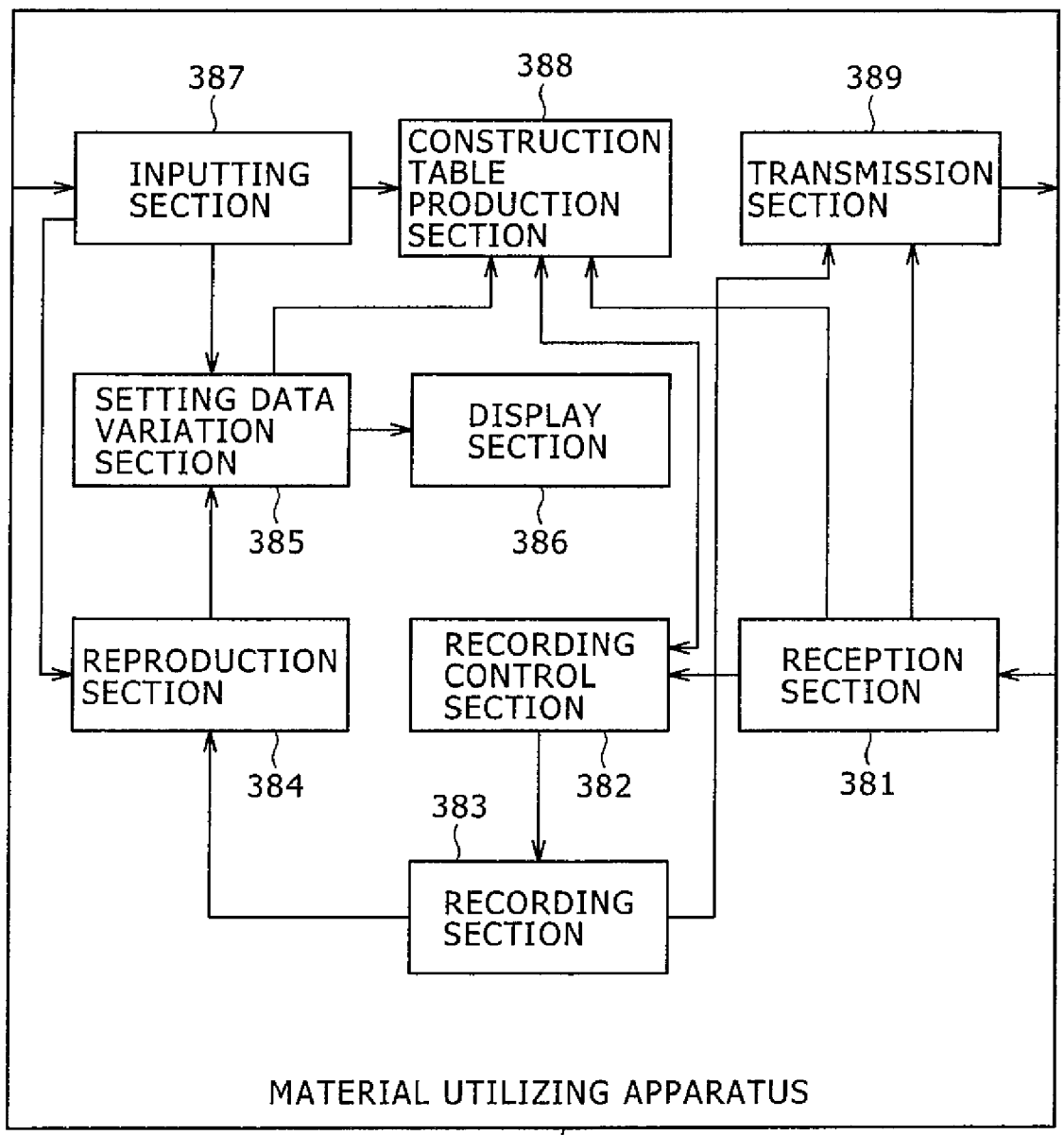
FIG. 11 is a block diagram showing an example of a functional configuration of the material utilizing apparatus.

FIG. 11 shows an example of a functional configuration of the material utilizing apparatus 29.

Referring to FIG. 11, the material utilizing apparatus 29 shown includes a reception section 381, a recording control section 382, a recording section 383, a reproduction section 384, a setting data variation section 385, a display section 386, an inputting section 387, a construction table production section 388 and a transmission section 389.

It is to be noted that the reception section 381 and the transmission section 389 correspond, for example, to the communication section 209 shown in FIG. 6, and the recording control section 382, reproduction section 384, setting data variation section 385, inputting section 387 and construction table production section 388 correspond, for example, to the CPU 201. Further, the recording section 383 corresponds, for example, to the recording section 208, and the display section 386 corresponds, for example, to the outputting section 207.

The reception section 381 receives an image pickup ID, material data and image pickup setting data transmitted thereto from the transmission section 307 (FIG. 7) of the camcorder 20 and supplies the material data to the recording control section 382. Further, the reception section 381 supplies the image pickup ID and the image pickup setting data to the construction table production section 388. Further, the reception section 381 receives a request for acquisition of a construction table transmitted thereto from the acquisition section 301 of the camcorder 20 and supplies the received request to the transmission section 389.

The recording control section 382 records material data from the reception section 381 into a predetermined address of the recording section 383 and supplies the address to the construction table production section 388. Further, the recording control section 382 records a construction table supplied thereto from the construction table production section 388 into the recording section 383 and updates the construction table recorded in the recording section 383 under the control of the construction table production section 388.

The reproduction section 384 detects an address corresponding to material data of a preview take of an object of reproduction from within the construction table stored in the recording section 383 in accordance with an instruction from the inputting section 387. Then, the reproduction section 384 reproduces the material data of the preview take recorded in an associated relationship with the detected address and corresponding preview use image pickup setting data and supplies the reproduced data to the setting data variation section 385.

The setting data variation section 385 produces, based on material data received from the reproduction section 384 and variation amounts to values representing the brightness, white balance, hue, gradation and black level inputted thereto from the inputting section 387, image data approximate to image data obtained as a result of image pickup using the image pickup setting data varied in response to the variation amounts. Then, the setting data variation section 385 supplies the produced image data to the display section 386 so that an image corresponding to the image data is displayed on the display section 386.

Further, the setting data variation section 385 determines image pickup setting data corresponding to image data corresponding to an image currently displayed on the display section 386 based on an instruction from the inputting section 387 and preview use image pickup setting data from the reproduction section 384. The setting data variation section 385 supplies the determined image pickup setting data to the construction table production section 388. It is to be noted that details of the setting data variation section 385 are hereinafter described with reference to FIG. 12.

The inputting section 387 accepts an input issued by an operation of the inputting section 206 shown in FIG. 6 by the user and issues an instruction to the reproduction section 384 in response to the input or inputs information to the setting data variation section 385 and the construction table production section 388.

In particular, the inputting section 387 accepts, for example, an input of a take number of a preview take of an object of reproduction from the user and issues an instruction to reproduce the reproduction object to the reproduction section 384 in response to the accepted input. Further, the inputting section 387 accepts an input of variation amounts to values representing the brightness, white balance, hue, gradation and black level from the user and supplies the variation amount as information to the setting data variation section 385 in response to the input.

Further, the inputting section 387 accepts an input of information relating to the scene number, scene title, cut number, cut title, take number and take, information representative of evaluation of the take, preview recommendation image setting data and so forth from the user. Then, the inputting section 387 supplies the accepted input as such information to the setting data variation section 385.

It is to be noted here that, while the take number is inputted by the user, the construction table production section 388 may otherwise apply a take number in the image pickup order to each take for each cut and describe the take number in the construction table. Further, the take number, information relating to the take and information representative of the evaluation of the take may be produced as meta data by the camcorder 20 and transmitted in an associated relationship with material data from the camcorder 20.

The construction table production section 388 produces a construction table in response to information supplied thereto from the inputting section 387 and supplies the construction table to the recording control section 382. Further, the construction table production section 388 controls the recording control section 382 based on an image pickup ID and image pickup setting data from the reception section 381, an address from the recording control section 382, image pickup setting data from the setting data variation section 385 or an input from the inputting section 387 to update the construction table recorded in the recording section 383.

The transmission section 389 reproduces a construction table from the recording section 383 in accordance with a request for acquisition of a construction table from the reception section 381. The transmission section 389 transmits the construction table to the acquisition section 301 (FIG. 7) of the camcorder 20.

Figure 12:
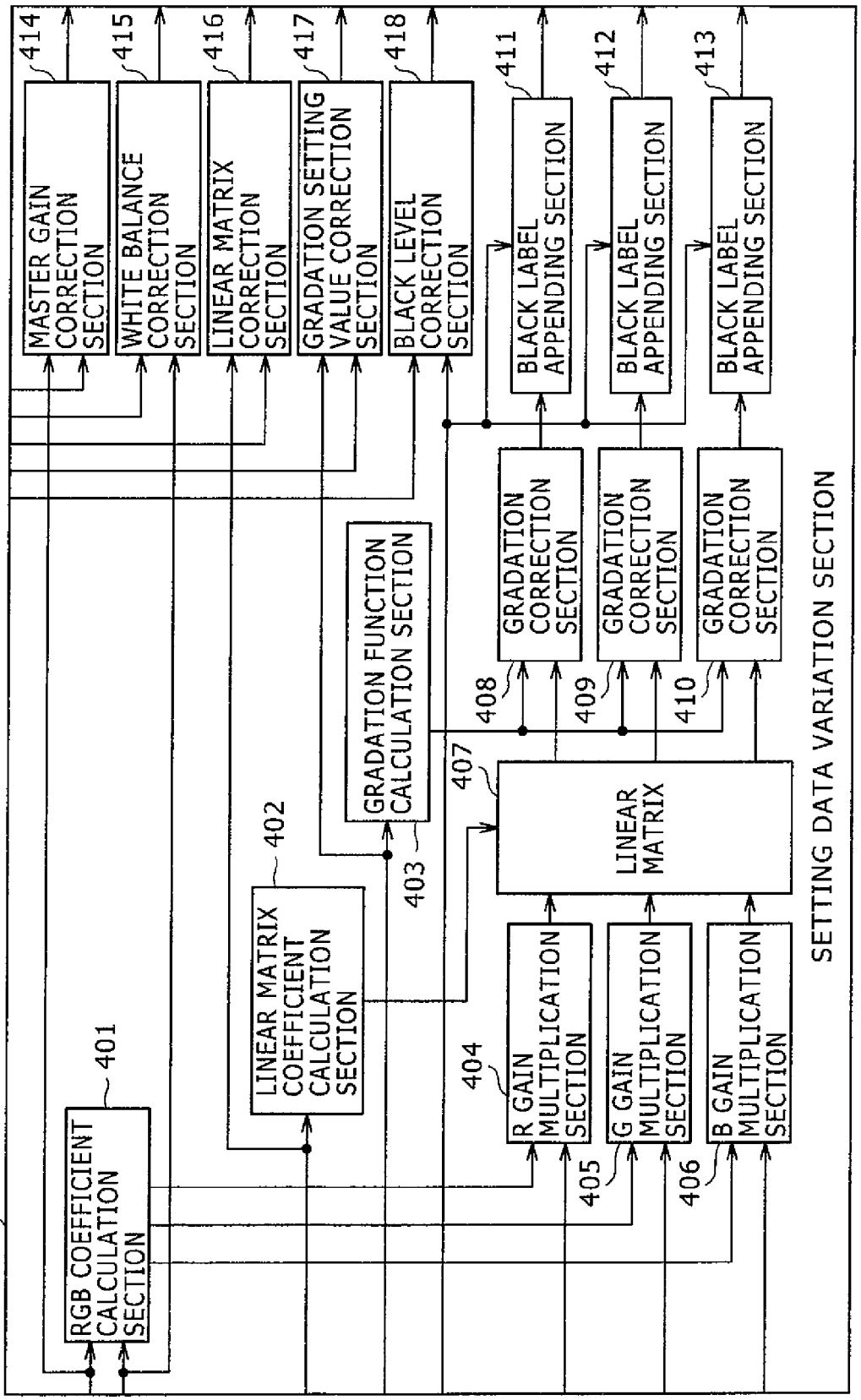
FIG. 12 is a block diagram showing an example of a detailed configuration of a setting data variation section of the material utilizing apparatus.

FIG. 12 shows an example of a detailed configuration of the setting data variation section 385 shown in FIG. 11.

Referring to FIG. 12, the setting data variation section 385 shown includes an RGB coefficient calculation section 401, a linear matrix coefficient calculation section 402, a gradation function calculation section 403, an R gain multiplication section 404, a G gain multiplication section 405, a B gain multiplication section 406, and a linear matrix 407. The setting data variation section 385 further includes gradation correction sections 408 to 410, black label appending sections 411 to 413, a master gain correction section 414, a white balance correction section 415, a linear matrix correction section 416, a gradation setting value correction section 417, and a black level correction section 418.

It is to be noted that, in FIG. 12, the camcorder 20 for preview image pickup and the camcorder 20 for actual image pickup are manufactured by the same manufacturer and image pickup setting data used in the two camcorders 20 have compatibility.

To the RGB coefficient calculation section 401, variation amounts to values representing the brightness and the white balance from among variation amounts inputted from the inputting section 387 shown in FIG. 11 are inputted. The RGB coefficient calculation section 401 calculates coefficients to be used by the R gain multiplication section 404, G gain multiplication section 405 and B gain multiplication section 406 in response to the inputted variation amounts and supplies the calculated coefficients to the R gain multiplication section 404, G gain multiplication section 405 and B gain multiplication section 406, respectively.

To the linear matrix coefficient calculation section 402, the variation amount to the value representing the hue from among the variation amounts inputted from the inputting section 387 is inputted. The linear matrix coefficient calculation section 402 calculates nine coefficients to be used in arithmetic operation by the linear matrix 407 in response to the variation amount inputted thereto and supplies the calculated coefficients to the linear matrix 407.

To the gradation function calculation section 403, the variation amount to the value representing the gradation number from among the variation amounts inputted from the inputting section 387 is inputted. The gradation function calculation section 403 determines a function for varying the gradation upon variation of the gradation amount in response to the variation amount inputted thereto. The gradation function calculation section 403 supplies the determined function to the gradation correction sections 408 to 410.

To the R gain multiplication section 404, an R signal from among image data of a preview take supplied from the reproduction section 384 is inputted. The R gain multiplication section 404 multiplies the R signal inputted thereto by a coefficient supplied thereto from the RGB coefficient calculation section 401 and supplies an R signal obtained by the multiplication to the linear matrix 407.

To the G gain multiplication section 405, a G signal from among image data of a preview take supplied from the reproduction section 384 is inputted. The G gain multiplication section 405 multiplies the G signal inputted thereto by a coefficient supplied thereto from the RGB coefficient calculation section 401 and supplies a G signal obtained by the multiplication to the linear matrix 407 similarly to the R gain multiplication section 404.

To the B gain multiplication section 406, a B signal from among image data of a preview take supplied from the reproduction section 384 is inputted. The B gain multiplication section 406 multiplies the B signal inputted thereto by a coefficient supplied thereto from the RGB coefficient calculation section 401 and supplies a B signal obtained by the multiplication to the linear matrix 407 similarly to the R gain multiplication section 404 and the G gain multiplication section 405.

The linear matrix 407 performs arithmetic operation based on coefficients from the linear matrix coefficient calculation section 402, an R signal from the R gain multiplication section 404, a G signal from the G gain multiplication section 405 and a B signal from the B gain multiplication section 406. Then, the linear matrix 407 supplies an R signal, a G signal and a B signal obtained by the arithmetic operation to the gradation correction sections 408, 409 and 410, respectively.

The gradation correction sections 408 to 410 convert an R signal, a G signal and a B signal from the linear matrix 407 using a function from the gradation function calculation section 403. Consequently, the gradation numbers of the R signal, G signal and B signal are varied. The gradation correction sections 408 to 410 supply the R signal, G signal and B signal after the conversion to the black label appending sections 411, 412 and 413, respectively.

To the black label appending sections 411 to 413, variation amounts to the values representing the black level from among variation amounts supplied thereto from the inputting section 387 are inputted. The black label appending sections 411 to 413 append a black level to the R signal, G signal and B signal supplied thereto from the gradation correction sections 408 to 410 in response to the variation amounts and output resulting signals to the display section 386.

The display section 386 displays an image obtained by varying an image based on an R signal, a G signal and a B signal and black levels from the black label appending sections 411 to 413, that is, an image of a preview take supplied thereto from the reproduction section 384, in response to variation amounts supplied from the inputting section 387 as an image (hereinafter referred to as approximate image) corresponding to image data approximate to image data obtained where a cut same as a cut corresponding to the preview take from the reproduction section 384 is picked up using image pickup setting data varied based on the variation amounts from the inputting section 387.

To the master gain correction section 414, a variation amount to the value representative of the brightness from among variation amounts supplied from the inputting section 387 and a master gain Gm from among image pickup setting data of a preview take supplied from the reproduction section 384 are supplied. The master gain correction section 414 calculates the following expression (1) using the variation amount to the value representing the brightness and the master gain Gm to obtain a new master gain Gm':

$$Gm'=Gm \times M_m \quad (1)$$

where the additive amount $M_m$ is a value corresponding to the variation amount to the value representing the brightness.

The master gain correction section 414 supplies the master gain Gm' determined in accordance with the expression (1) given above as a master gain of the actual recommendation image pickup setting data of a cut corresponding to the preview take of the object of reproduction to the construction table production section 388.

To the white balance correction section 415, a variation amount to the value representing the white balance from among variation amounts supplied from the inputting section 387 and white balance Wr, Wg and Wb from among image pickup setting data of a preview take supplied from the reproduction section 384 are supplied. The white balance correction section 415 calculates the following expressions (2) based on the variation amount to the value representing the white balance and the white balance Wr, Wg and Wb to obtain new white balance Wr', Wg' and Wb':

$$Wr'=Wr \times M_r$$
$$Wg'=Wg \times M_g$$
$$Wb'=Wb \times M_b \quad (2)$$

where the additive amounts $M_r$, $M_g$ and $M_b$ are values corresponding to the variation amounts to the values representing the white balance.

The white balance correction section 415 supplies the white balance Wr', Wg' and Wb' determined in accordance with the expression (2) given above as a white balance for actual recommendation image pickup setting data corresponding to a preview take of the object of reproduction to the construction table production section 388.

To the linear matrix correction section 416, a variation amount to the value representing the hue from among variation amounts supplied from the inputting section 387 and the nine coefficients $a_{ij}$ to be used by the linear matrix 407 from among image pickup setting data of a preview take supplied from the reproduction section 384 are supplied. The linear matrix correction section 416 calculates the following expression (3) based on the variation amount to the value representing the hue and the coefficients $a_{ij}$ to obtain new coefficients $a_{ij}'$:

$$a_{ij}'=M_{ij} \times a_{ij} \quad (3)$$

where the additive amount $M_{ij}$ is a value corresponding to the variation amount to the value representing the hue.

The linear matrix correction section 416 supplies the coefficients $a_{ij}'$ determined in accordance with the expression (3) given above as coefficients to be used in arithmetic operation of a linear matrix to actual recommendation image pickup setting data of a cut corresponding to a preview take of the object of reproduction to the construction table production section 388.

To the gradation setting value correction section 417, a variation amount to the value representing the gradation number from among variation amounts supplied from the inputting section 387 and the two coefficients $b_n$ and $c_n$ for setting a gradation from among image pickup setting data of a preview take supplied from the reproduction section 384 are supplied. The gradation setting value correction section 417 calculates the following expressions (4) based on the variation amount to the value representing the gradation number and the coefficients $b_n$ and $c_n$ to obtain new coefficients $b_n'$ and $c_n'$:

$$Y'=Y+M_y$$

where $$Y=fr(x)=b_n \times x+c_n \ (k_n \leq x \leq k_{n+1})$$

$$Y'=fr(x)=b_n' \times x+c_n' \ (k_n \leq x \leq k_{n+1})$$

$$M_y=fr(x)=bm_n \times x+cm_n \ (k_n \leq x \leq k_{n+1}) \quad (4)$$

where x is a signal value; Y a gradation setting value; $k_n$ a start value of the nth interval from the top when the signal value is delimited into predetermined intervals; $k_{n+1}$ a start value of the k+1th interval; and coefficients $bm_n$ and $cm_n$ are values corresponding to the variation amount to the value representing the gradation number.

It is to be noted that, in the expressions (4), a conversion expression from a signal value into a gradation setting value is approximated by a linear expression for each interval. Thus, for example, the gradation number increases as the value $b_n'$ decreases, but the gradation number decreases as the value $b_n'$ increases.

The gradation setting value correction section 417 supplies the coefficients $b_n'$ and $c_n'$ determined in accordance with the expression (4) given hereinabove as coefficients $b_n'$ and $c_n'$ for the determination of the gradation setting value from among actual recommendation image pickup setting data of a cut corresponding to the preview take of the reproduction object to the construction table production section 388.

To the black level correction section 418, a variation amount to the value representing the black level from among variation amounts supplied from the inputting section 387 and the black level B from among image pickup setting data of a preview take supplied from the reproduction section 384 are supplied. The black level correction section 418 calculates the following expression (5) based on the variation amount to the value representing the black level and the black level B to obtain a new black level B':

$$B'=B+M_B \quad (5)$$

where the additive amount $M_B$ is a value corresponding to the variation amount to the value representing the black level.

The black level correction section 418 supplies the black level B' determined in accordance with the expression (5) given above as a black level for actual recommendation image pickup setting data of a cut corresponding to a preview take of the object of reproduction to the construction table production section 388.

As described above, the setting data variation section 385 varies image pickup setting data of a preview take supplied from the reproduction section 384 based on variation amounts supplied from the inputting section 387. Therefore, by setting the image pickup setting data after the variation as image pickup setting data to be used in actual image pickup, the camcorder 20 can set precise image pickup data for obtaining an image intended by a planner who is the user of the material utilizing apparatus 29. As a result, the camcorder 20 can carry out image pickup desired by the planner.

It is to be noted that, while it is described that image pickup setting data to be used in the camcorder 20 for preview image pickup and the camcorder 20 for actual image pickup in FIG. 12 have compatibility, the camcorder 20 for preview image pickup and the camcorder 20 for actual image pickup may be manufactured by different manufacturers and hence image pickup setting data to be used in the two camcorders 20 may not have compatibility. In this instance, the master gain correction section 414, white balance correction section 415, linear matrix correction section 416, gradation setting value correction section 417 and black level correction section 418 convert the additive amounts $M_m$, $M_r$, $M_g$, $M_b$ and $M_B$ in accordance with the following expressions (6):

$$M_m'=K1 \times M_m+K2$$

$$M_r'=K1 \times M_r+K2$$

$$M_g'=K1 \times M_g+K2$$

$$M_b'=K1 \times M_b+K2$$

$$M_B'=K1 \times M_B+K2 \quad (6)$$

where K1 and K2 are coefficients set in advance for different combinations of manufacturers of the camcorders 20 for preview image pickup and for actual image pickup.

Information representing the manufactures of the camcorders 20 for preview image pickup and for actual image pickup is inputted to the master gain correction section 414, white balance correction section 415, linear matrix correction section 416, gradation setting value correction section 417 and black level correction section 418, for example, by the user.

After the calculation of the expression (6), the master gain correction section 414, white balance correction section 415, linear matrix correction section 416, gradation setting value correction section 417 and black level correction section 418 use the additive amounts $M_m'$, $M_r'$, $M_g'$, $M_b'$ and $M_B'$ as the additive amounts $M_m$, $M_r$, $M_g$, $M_b$ and $M_B$ of the expressions (1) to (5) to calculate the expressions (1) to (5) to determine actual recommendation image pickup setting data.

Now, an example of a screen 430 for displaying an approximate image by the display section 386 shown in FIG. 11 is described with reference to FIG. 13.

Figure 13:
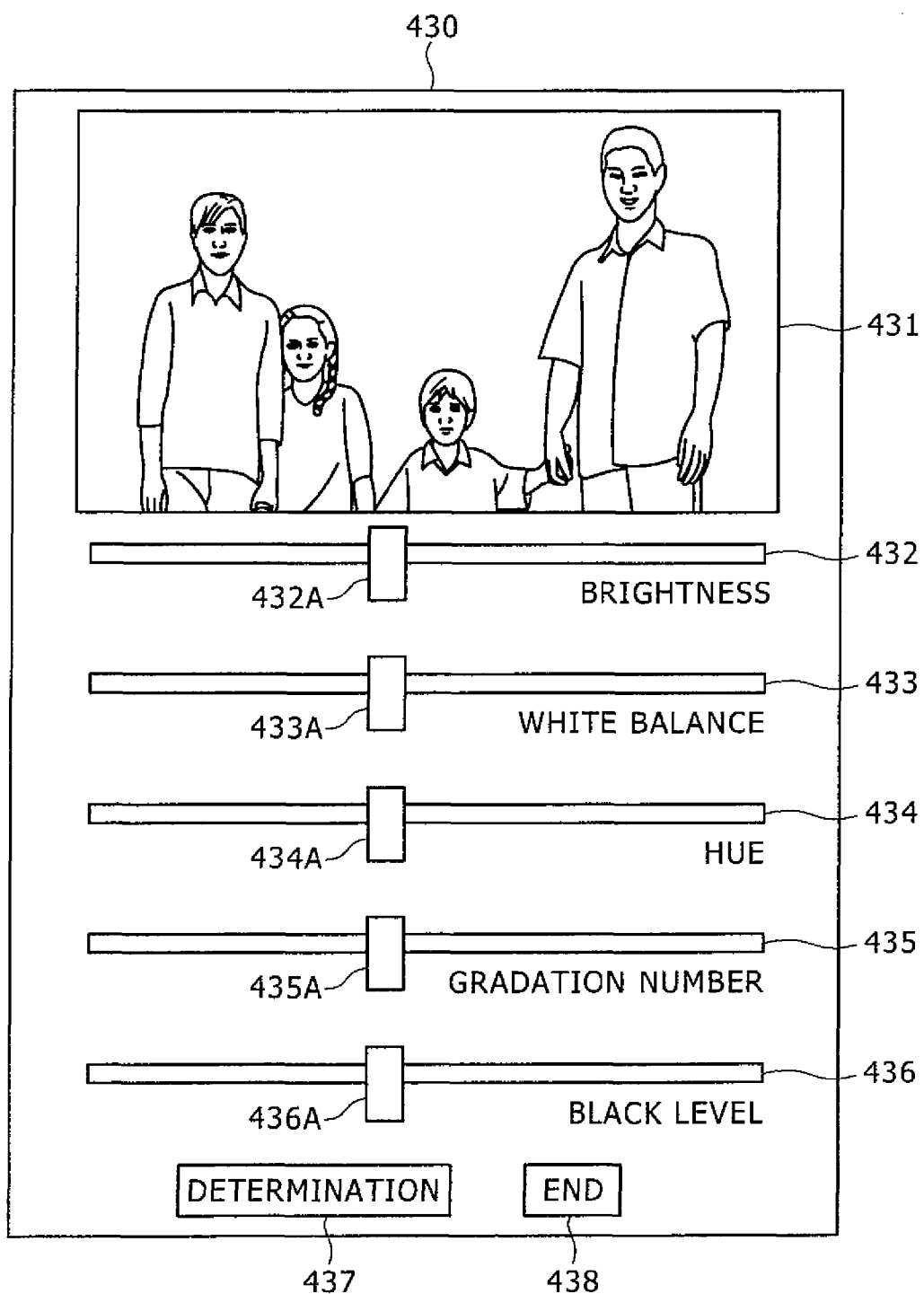
FIG. 13 is a view showing an example of a screen for displaying an approximate image.

Referring to FIG. 13, the screen 430 shown includes an image display section 431, a brightness value variation bar 432, a white balance value variation bar 433, a hue value variation bar 434, a gradation number variation value 435, a black level value variation bar 436, a determination button 437 and an end button 438.

On the image display section 431, an approximate image is displayed based on an R signal, a G signal and a B signal from the black label appending sections 411 to 413 shown in FIG. 12.

The brightness value variation bar 432 is operated by the user to vary the value representing the brightness of the image displayed on the image display section 431. In particular, the user would operate a knob 432A provided on the brightness value variation bar 432 to input a variation amount to the value representing the brightness of the image displayed on the image display section 431.

The white balance value variation bar 433, hue value variation bar 434, gradation number variation value 435 and black level value variation bar 436 are operated by the user in order to vary the values representing the white balance, hue, gradation number and black level of the image displayed on the image display section 431, respectively, similarly to the brightness value variation bar 432.

In particular, the user would move a knob 433A provided on the white balance value variation bar 433, another knob 434A provided on the hue value variation bar 434, a further knob 435A provided on the gradation number variation value 435 and a still further knob 436A provided on the black level value variation bar 436 to input the variation amounts to the values representing the white balance, hue, gradation number and black level of the image displayed on the image display section 431, respectively.

The determination button 437 is operated by the user to determine a variation amount inputted using any of the brightness value variation bar 432, white balance value variation bar 433, hue value variation bar 434, gradation number variation value 435 and black level value variation bar 436. For example, if an approximate image displayed on the image display section 431 is nearest to an image intended by the user, then the user would operate the determination button 437. The end button 438 is operated by the user to end the display of the screen 430.

Now, a setting process of the camcorder 20 shown in FIG. 7 for setting image pickup setting data is described with reference to FIG. 14. This setting process is started, for example, when the user operates the inputting section 76 to issue an instruction to display the screen 320 shown in FIG. 8.

It is to be noted that, while the setting process illustrated in FIG. 14 sets preview recommendation image pickup setting data as image pickup setting data, a similar process is executed also when actual recommendation image pickup setting data are set as image pickup setting data.

At step S41, the acquisition section 301 issues a request for a construction table (FIG. 2) to the material utilizing apparatus 29 in response to an instruction to display the screen 320 shown in FIG. 8, which is supplied from the inputting section 305 in response to an operation of the inputting section 76 by the user.

After the process at step S41, the processing advances to step S42, at which the acquisition section 301 acquires a construction table transmitted thereto from the material utilizing apparatus 29 in response to the request. Thereafter, the processing advances to step S43, at which the acquisition section 301 produces image data for displaying the screen 320 shown in FIG. 8 based on the acquired construction table and supplies the image data to the display section 302 so that the screen 320 is displayed on the display section 302.

Here, the user would operate the inputting section 76 to operate the upward button 322A or the downward button 322B shown in FIG. 8 to move the cursor 331 to a position corresponding to preview recommendation image pickup setting data of a setting object. Then, the user would operate the leftward button 323A or the rightward button 323B to move the selection region 332 so as to select "display" which is information corresponding to the small item "recommendation" displayed in the cursor 331.

At step S44, the inputting section 305 decides whether or not the execution button 324 is operated by the user, that is, whether or not the user operates the inputting section 76 to operate the execution button 324. If it is decided at step S44 that the execution button 324 is operated, then the inputting section 305 issues an instruction to the acquisition section 301 to display the screen 340 (FIG. 9) for displaying preview recommendation image pickup setting data corresponding to the selection region 332. Thereafter, the processing advances to step S45.

At step S45, the acquisition section 301 produces image data for displaying the screen 340 based on the instruction from the inputting section 305 and the preview recommendation image pickup setting data corresponding to the selection region 332 and supplies the produced image data to the display section 302 so that the screen 340 is displayed on the display section 302.

After the process at step S45, the processing advances to step S46, at which the inputting section 305 decides whether or not the setting execution button 342 shown in FIG. 9 is operated by the user. If it is decided that the setting execution button 342 is operated, then the inputting section 305 supplies an instruction to the setting section 303 to set the preview recommendation image pickup setting data displayed on the screen 340. Thereafter, the processing advances to step S47.

At step S47, the setting section 303 extracts, from within the preview recommendation image pickup setting data included in the construction table acquired by the acquisition section 301, that preview recommendation image pickup setting data which is displayed on the screen 340, that is, the preview recommendation image pickup setting data whose setting is designated by the user. Then, the setting section 303 sets the extracted preview recommendation image pickup setting data as image pickup setting data to be used for image setup by the image pickup section 304, thereby ending the processing.

On the other hand, if it is decided at step S44 that the execution button 324 shown in FIG. 8 is not operated, then the processing advances to step S48, at which the inputting section 305 decides whether or not the end button 325 is operated. If it is decided at step S48 that the end button 325 is not operated, then the processing returns to step S44. Consequently, the processes at steps S44 and S48 are repeated until the execution button 324 or the end button 325 is operated.

On the other hand, if it is decided at step S48 that the end button 325 is operated, then the inputting section 305 supplies an instruction to the acquisition section 301 to stop the display of the screen 320. As a result, the display section 302 ends the display of the screen 320.

On the other hand, if it decided at step S46 that the setting execution button 342 shown in FIG. 9 is not operated, then the processing advances to step S49, at which the inputting section 305 decides whether or not the end button 343 is operated. If it is decided that the end button 343 is not operated, then the processing returns to step S346. Consequently, the process at steps S46 and S49 are repeated until the setting execution button 342 or the end button 343 is operated.

On the other hand, if it is decided at step S49 that the end button 343 is operated, then the inputting section 305 supplies an instruction to the acquisition section 301 to stop the display of the screen 340. As a result, the display section 302 ends the display of the screen 340.

As described above, the camcorder 20 acquires a construction table produced based on an input by the user of the material utilizing apparatus 29 from the material utilizing apparatus 29 and sets preview recommendation image pickup setting data included in the construction table as image pickup setting data to be used for image pickup. Consequently, image pickup intended by the user of the material utilizing apparatus 29 located remotely can be performed readily and with certainty.

Now, a preview image pickup process performed for preview image pickup by the camcorder 20 shown in FIG. 7 is described with reference to FIG. 15. This preview image pickup process is started when, for example, the user operates the inputting section 76 shown in FIG. 5 to input a scene number and a cut number corresponding to a cut of an object of preview image pickup.

At step S61, the inputting section 305 decides whether or not an instruction to vary image pickup setting data is issued by the user. If it is decided that an instruction to vary the image pickup setting data is issued, then the inputting section 305 issues an instruction to the setting section 303 to vary the currently set image pickup setting data in response to the instruction. Then, the processing advances to step S62.

At step S62, the setting section 303 varies the currently set image pickup setting data in response to the instruction thereby to vary the image pickup setting data from the inputting section 305.

When it is decided at step S61 that an instruction to vary the image pickup setting data is not issued or after the process at step S62, the processing advances to step S63, at which the inputting section 305 decides whether or not an instruction for preview image pickup is issued by the user. If it is decided at step S63 that an instruction for preview image pickup is not issued, then the inputting section 305 waits that an instruction for review image pickup is issued.

If it is decided at step S63 that an instruction for preview image pickup is issued, then the inputting section 305 issues an instruction for preview image pickup to the image pickup section 304 and supplies the scene number and the cut number inputted by the user to the image pickup section 304. Thereafter, the processing advances to step S64.

At step S64, the image pickup section 304 carries out preview image pickup using the image pickup setting data set by the setting section 303.

After the process at step S64, the processing advances to step S65, at which the image pickup section 304 produces an image pickup ID based on the scene number and the cut number supplied from the inputting section 305 and information representing the preview image pickup. Further, the image pickup section 304 causes the recording section 306 to record material data obtained by the preview image pickup and the image pickup setting data used in the preview image pickup in an associated relationship with the image pickup ID.

After the process at step S65, the processing advances to step S66, at which the transmission section 307 reads out the material data, image pickup setting data and image pickup ID recorded in the recording section 306 and transmits the read out data to the material utilizing apparatus 29, thereby ending the processing.

As described above, every time preview image pickup of a predetermined scene is performed, the camcorder 20 transmits material data, image pickup setting data and an image pickup ID of the cut to the material utilizing apparatus 29.

It is to be noted that, while FIG. 15 illustrates the preview image pickup process carried out by the camcorder to perform preview image pickup, also a process for carrying out actual image pickup is performed similarly.

Figure 16:
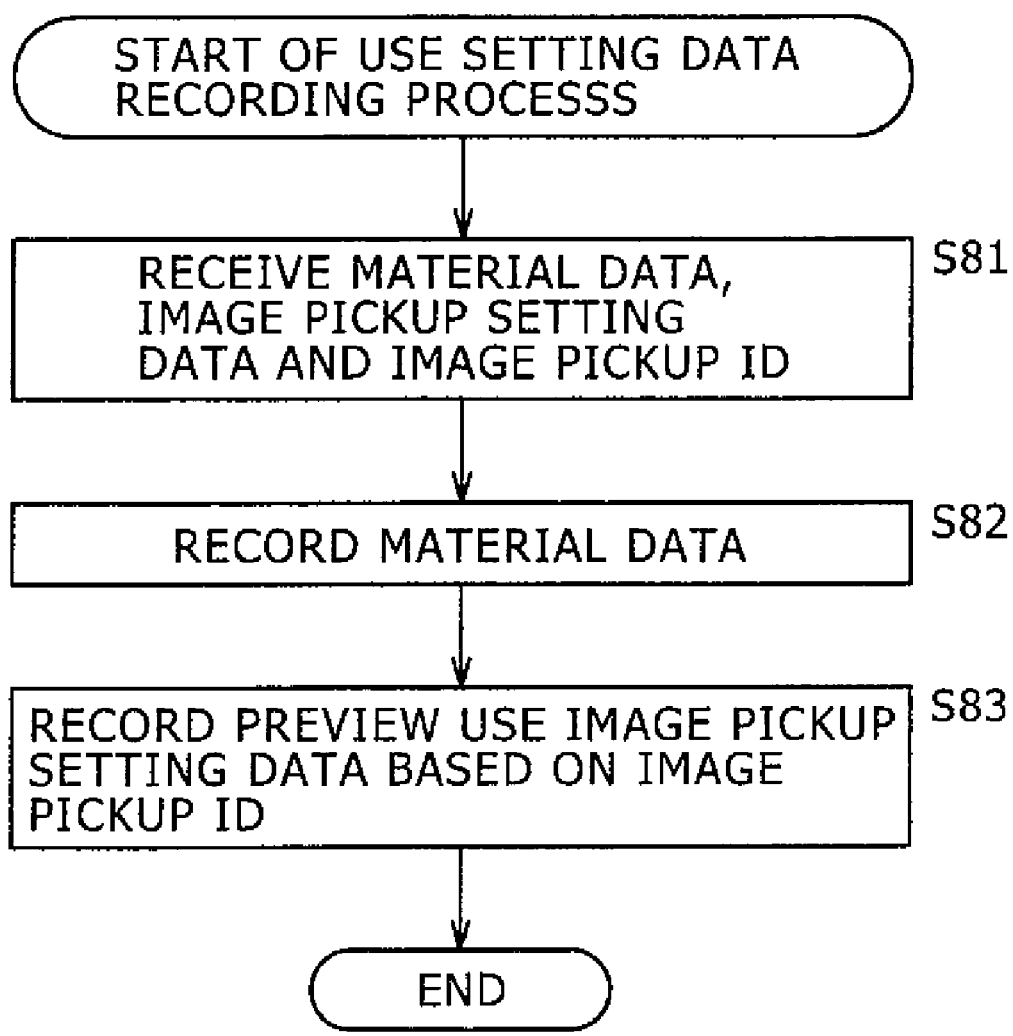
FIG. 16 is a flow chart illustrating a use setting data recording process.

Now, a use setting data recording process carried out by the material utilizing apparatus 29 shown in FIG. 11 to record preview use image pickup setting data is described with reference to FIG. 16. This use setting data recording process is started, for example, when material data, image pickup setting data and an image pickup ID are transmitted from the transmission section 307 to the material utilizing apparatus 29 at step S66 of FIG. 15.

At step S81, the reception section 381 receives material data, image pickup setting data and an image pickup ID from the transmission section 307 of the camcorder 20 and supplies the material data to the recording control section 382 while it supplies the image pickup setting data and the image pickup ID to the construction table production section 388.

After the process at step S81, the processing advances to step S82, at which the recording control section 382 records the material data from the reception section 381 into a predetermined address of the recording section 383 and supplies the address and a material ID appended to the material data to the construction table production section 388.

After the step S82, the processing advances to step S83, at which the construction table production section 388 controls the recording control section 382 to record the image pickup setting data from the reception section 381 as preview use image pickup setting data into the recording section 383 based on the image pickup ID from the reception section 381.

For example, if the image pickup ID from the reception section 381 is "preview 11" and the construction table shown in FIG. 2 is recorded in the recording section 383, then the construction table production section 388 first controls the recording control section 382 to record "3" obtained by adding 1 to the currently existing maximum number "2" as information of the small item "take number" corresponding to the information "1" of the small item "scene number" of the construction table of FIG. 2 and corresponding to the information "1" of the small item "cut number" into the recording section 383.

Then, the construction table production section 388 controls the recording control section 382 to record the image pickup setting data from the reception section 381 as preview use image pickup setting data which are information corresponding to the small item "3" newly appended as the information of the small item "take number" and corresponding to the small item "use" of the large item "preview image setting data" into the recording section 383. In particular, the image pickup setting data supplied from the reception section 381 are entered into a place of the construction table recorded in the recording section 383 which corresponds to the information "3" corresponding to the small item "take number" and corresponds to the small item "use" of the large item "preview image pickup setting data".

It is to be noted that, while recording of preview use image pickup setting data is described above with reference to FIG. 16, a similar process is executed also when actual use image pickup setting data are set.

Figure 17:
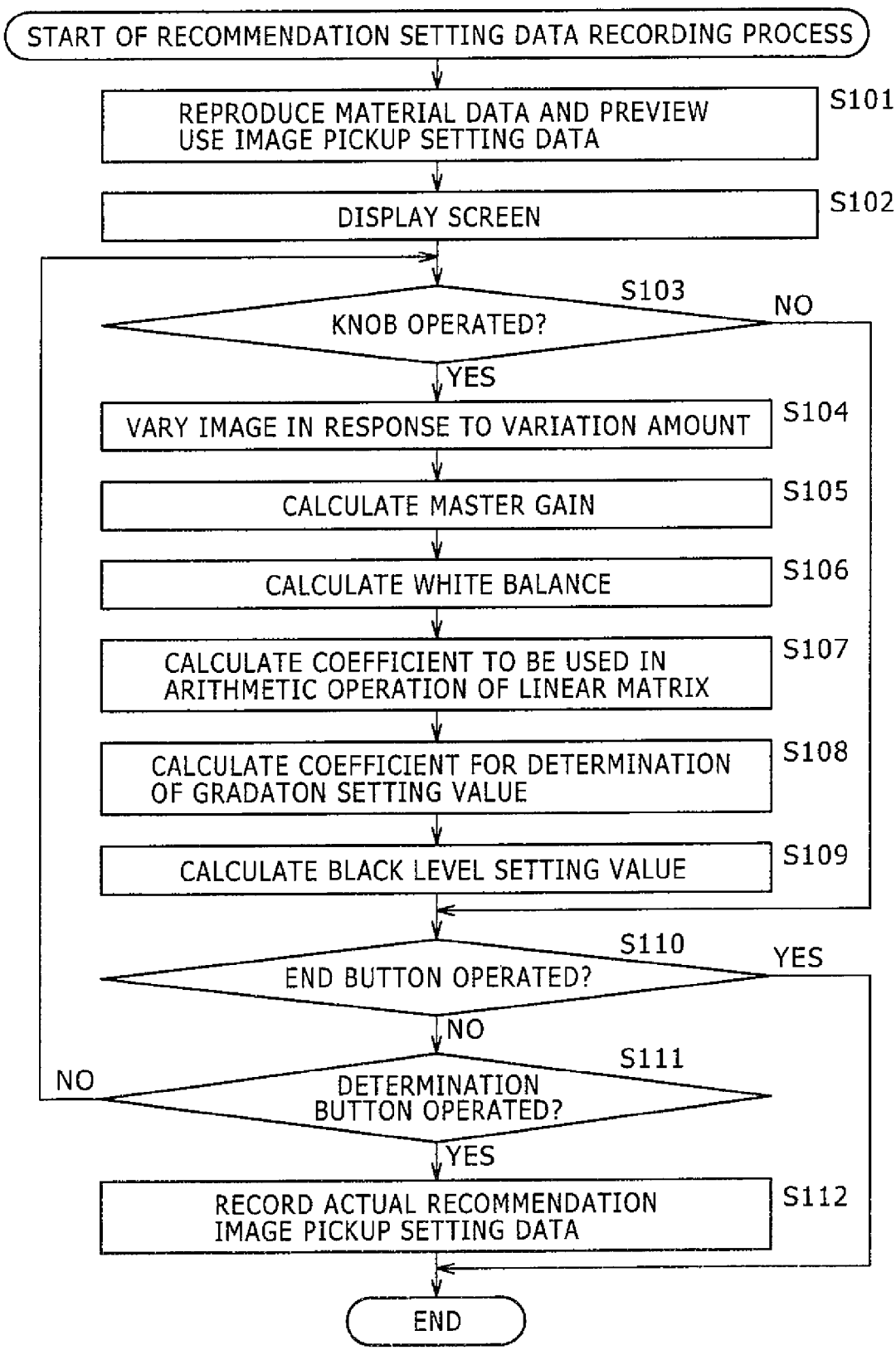
FIG. 17 is a flow chart illustrating a recommendation setting data recording process.

Now, a recommendation setting data recording process carried out by the material utilizing apparatus 29 shown in FIG. 11 to record actual recommendation image pickup setting data is described with reference to FIG. 17. This recommendation setting data setting process is executed, for example, when the user operates the inputting section 206 shown in FIG. 6 to input a take number of a preview take corresponding to actual recommendation image pickup setting data of an object of setting as a take number of a preview take of a reproduction object.

At step S101, the reproduction section 384 reproduces, in response to an instruction from the inputting section 387 corresponding to an input of a take number of an object of reproduction by the user, material data of a preview take of the object of reproduction and corresponding preview use image pickup setting data. Then, the reproduction section 384 supplies the reproduced preview use image pickup setting data to the setting data variation section 385.

At step S102, the setting data variation section 385 causes the display section 386 to display the screen 430 shown in FIG. 13 based on image data from within the material data from the reproduction section 384. At this time, an image corresponding to the image data from the reproduction section 384 is displayed on the image display section 431 of the screen 430.

After the process at step S102, the processing advances to step S103, at which the inputting section 387 decides whether or not at least one of the knobs 432A to 436A shown in FIG. 13 is operated. If it is decided that at least one of the knobs 432A to 436A is operated, then the inputting section 387 supplies a variation amount corresponding to the operation to the setting data variation section 385, whereafter the processing advances to step S104.

At step S104, the setting data variation section 385 varies the image to be displayed on the image display section 431 in response to the variation amount from the inputting section 387. In particular, the RGB coefficient calculation section 401, linear matrix coefficient calculation section 402, gradation function calculation section 403, R gain multiplication section 404, G gain multiplication section 405, B gain multiplication section 406, linear matrix 407, gradation correction sections 408 to 410 and black label appending sections 411 to 413 shown in FIG. 12 carry out such processes as described hereinabove with reference to FIG. 12. Consequently, an R signal, a G signal and a B signal to each of which a black level is appended are outputted from the black label appending sections 411 to 413 to the display section 386, respectively. As a result, the image to be displayed on the image display section 431 is varied.

After the process at step S104, the processing advances to step S105. At step S105, the master gain correction section 414 of the setting data variation section 385 calculates the expression (1) given hereinabove based on the variation amount to the value representing the brightness from among the variation amounts supplied from the inputting section 387 and the master gain Gm from among the image pickup setting data of the preview take supplied from the reproduction section 384 to obtain a new master gain Gm'.

Then, the master gain correction section 414 supplies the master gain Gm' as a master gain for actual recommendation image pickup setting data of a cut corresponding to the preview take of the production object to the construction table production section 388.

After the process at step S105, the processing advances to step S106. At step S106, the white balance correction section 415 calculates the expression (2) given hereinabove based on the variation amount to the value representing the white balance from among the variation amounts supplied from the inputting section 387 and the white balance Wr, Wg and Wb from among the image pickup setting data of the preview take supplied from the reproduction section 384 to obtain a new white balance Wr', Wg' and Wb'.

Then, the white balance correction section 415 supplies the white balance Wr', Wg' and Wb' as a white balance for the actual recommendation image pickup setting data of the cut corresponding to the preview take of the reproduction object to the construction table production section 388.

After the process at step S106, the processing advances to step S107. At step S107, the linear matrix correction section 416 calculates the expression (3) given hereinabove based on the variation amount to the value representing the hue from among the variation amounts supplied from the inputting section 387 and the nine coefficients $a_{ij}$ to be used in the linear matrix 407 from among the image pickup setting data supplied from the reproduction section 384 to obtain new coefficients $a_{ij}'$.

Then, the linear matrix correction section 416 supplies the coefficients $a_{ij}'$ as coefficients to be used in arithmetic operation of a linear material for the actual recommendation image pickup setting data of the cut corresponding to the preview take of the reproduction object to the construction table production section 388.

After the process at step S107, the processing advances to step S108. At step S108, the gradation setting value correction section 417 calculates the expression (4) given hereinabove based on the variation amount to the value representing the gradation number from among the variation amounts supplied from the inputting section 387 and the two coefficients $b_n$ and $c_n$ for setting a gradation from among the image pickup setting data of the preview take supplied from the reproduction section 384 to obtain new coefficients $b_n'$ and $c_n'$.

Then, the gradation setting value correction section 417 supplies the coefficients $b_n'$ and $c_n'$ as coefficients $b_n'$ and $c_n'$ for the determination of a gradation setting value for the actual recommendation image pickup setting data of the cut corresponding to the preview take of the reproduction object.

After the process at step S108, the processing advances to step S109. At step S109, the black level correction section 418 calculates the expression (5) given hereinabove based on the variation amount to the value representing the black level from among the variation amounts supplied from the inputting section 387 and the black level B from among the image pickup setting data of the preview take supplied from the reproduction section 384 to obtain a new black level B'.

Then, the black level correction section 418 supplies the black level B' as a black level for the actual recommendation image pickup setting data of the cut corresponding to the preview take of the reproduction object to the construction table production section 388.

After the process at step S109, the processing advances to step S110, at which the inputting section 387 decides whether or not the end button 438 is operated by the user. If it is decided that the end button 438 is not operated, then the processing advances to step S111.

At step S111, the inputting section 387 decides whether or not the determination button 437 is operated by the user. If it is decided that the determination button 437 is not operated, then the processing returns to step 103 so that the processes described hereinabove are repeated.

On the other hand, if it is decided at step S111 that the determination button 437 is operated by the user, then the processing advances to step S112. At step S112, the construction table production section 388 determines the actual recommendation image pickup setting data supplied from the setting data variation section 385 just before then as actual recommendation image pickup setting data to be recorded into the construction table. Then, the construction table production section 388 records the actual recommendation image pickup setting data as information which corresponds to a cut number corresponding to the image displayed on the image display section 431 and corresponds to the small item "recommendation" of the large item "actual image pickup setting data" in the construction table into the recording section 383 thereby to update the construction table.

The material utilizing apparatus 29 determines, based on preview use image pickup setting data, actual recommendation image pickup setting data of a cut corresponding to the preview use image pickup setting data and records the actual recommendation image pickup setting data in such a manner as described above.

Thereafter, the setting process of FIG. 14 where the actual recommendation image pickup setting data are set as image pickup setting data is started. Then, if a request to acquire the construction table is issued from the acquisition section 301 of the camcorder 20 at step S41, then the transmission section 389 reproduces the construction table updated at step S112 from the recording section 383 and transmits the reproduced construction table to the acquisition section 301 of the camcorder 20. then, the acquisition section 301 acquires the construction table at step S42 and then executes the succeeding processes.

As described above, the camcorder 20 transmits material data obtained by preview image pickup and preview use image pickup setting data used in the preview image pickup to the material utilizing apparatus 29 so that it acquires the actual recommendation image pickup setting data determined based on the preview use image pickup setting data by the material utilizing apparatus 29 from the material utilizing apparatus 29. Consequently, by setting the actual recommendation image pickup setting data as actual image pickup setting data to be used in actual image pickup, the camcorder 20 can carry out actual image pickup intended by a planner who is the user of the material utilizing apparatus 29 located remotely with certainty.

On the other hand, if it is decided at step S103 that none of the knobs 432A to 436A is operated, then the inputting section 387 skips the steps S104 to S109 and advances the processing to step S110.

Further, if the inputting section 387 decides at step S110 that the end button 438 is operated, then the processing is ended.

It is to be noted that, while, in the foregoing description, various data such as image pickup setting data and material data are communicated through the network 31, the camcorder 20 and the material utilizing apparatus 29 may record image pickup setting data on a medium such as the removable medium 33 such that the image pickup setting data may be communicated through the medium.

Further, while, in the foregoing description, actual recommendation image pickup setting data are recommended as image pickup setting data to be used for actual image pickup of a cut same as a cut corresponding to preview use image pickup setting data based on which the actual recommendation image pickup setting data are produced, they may otherwise be recommended as image pickup setting data to be used in image pickup of another cut or another work.

It is to be noted that, in the present specification, the steps which describe the program stored in or on a program recording medium may be but need not necessarily be processed in a time series in the order as described, and include processes which are executed parallelly or individually without being processed in a time series.

Further, in the present specification, the term "system" is used to represent an entire apparatus composed of a plurality of apparatus.

While a preferred embodiment of the present invention has been described using specific terms, such description is for illustrative purpose only, and it is to be understood that changes and variations may be made without departing from the spirit or scope of the following claims.

What is claimed is:

1. An image pickup apparatus comprising:
means for receiving a construction table from an information processing apparatus having means for transmitting the construction table, the construction table including image pickup setting data corresponding to a scene, a cut, or a take;
means for selecting a desired scene, a desired cut, or a desired take from the construction table;
setting means for setting the image pickup setting data corresponding to the scene, the cut, or the take;
variation means for varying the image pickup setting data set by the setting means;
image pickup means for carrying out image pickup by using the image pickup setting data varied by the variation means, and for recording image data in an associated relationship with the scene, the cut, or the take;
construction table recording means for recording the image pickup setting data varied by the variation means onto the construction table in an associated relationship with the scene, the cut, or the take; and
means for transmitting the construction table,
the construction table cross-referencing recommendation preview image pickup setting data with use preview image pickup setting data on a scene-by-scene basis, or cross-referencing recommendation actual image pickup setting data with use actual image pickup setting data on a scene-by-scene basis.

2. An information processing apparatus comprising:
means for transmitting a construction table including image pickup setting data corresponding to a scene, a cut, or a take;
means for receiving image data and the construction table from an image pickup apparatus,
the image pickup apparatus including:
means for receiving the construction table;
means for selecting a desired scene, a desired cut, or a desired take from the construction table;
setting means for setting the image pickup setting data corresponding to the scene, the cut, or the take;
variation means for varying the image pickup setting data set by the setting means;
image pickup means for carrying out image pickup by using the image pickup setting data varied by the variation means, and for recording the image data in an associated relationship with the scene, the cut, or the take;
construction table recording means for recording the image pickup setting data varied by the variation means onto the construction table in an associated relationship with the scene, the cut, or the take; and
means for transmitting the construction table;
reproduction means for reproducing the image pickup setting data corresponding to the scene, the cut, or the take;
accepting means for accepting a variation amount to achieve a value corresponding to setting data inputted by a user;
second variation means for varying the image pickup setting data reproduced by the reproduction means, based on the variation amount accepted by the accepting means; and
recording means for recording the image pickup setting data varied by the second variation means onto the construction table, in an associated relationship with to the scene, the cut, or the take,
the construction table cross-referencing recommendation preview image pickup setting data with use preview image pickup setting data on a scene-by-scene basis, or cross-referencing recommendation actual image pickup setting data with use actual image pickup setting data on a scene-by-scene basis.

* * * * *